United States Patent
Tagawa et al.

(10) Patent No.: US 10,948,728 B2
(45) Date of Patent: Mar. 16, 2021

(54) DYNAMIC IMAGE PROCESSING DEVICE FOR HEAD MOUNTED DISPLAY, DYNAMIC IMAGE PROCESSING METHOD FOR HEAD MOUNTED DISPLAY AND HEAD MOUNTED DISPLAY SYSTEM

(71) Applicant: SHIMADZU CORPORATION, Kyoto (JP)

(72) Inventors: Yusuke Tagawa, Kyotanabe (JP); Kaname Hasebe, Kyotanabe (JP); Kazuho Tawada, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 312 days.

(21) Appl. No.: 15/534,560

(22) PCT Filed: Dec. 2, 2015

(86) PCT No.: PCT/JP2015/083849
§ 371 (c)(1),
(2) Date: Jun. 9, 2017

(87) PCT Pub. No.: WO2016/098591
PCT Pub. Date: Jun. 23, 2016

(65) Prior Publication Data
US 2017/0343823 A1    Nov. 30, 2017

(30) Foreign Application Priority Data

Dec. 15, 2014 (JP) ................... 2014-252871

(51) Int. Cl.
*G09G 5/377* (2006.01)
*G02B 27/01* (2006.01)
(Continued)

(52) U.S. Cl.
CPC ..... *G02B 27/0179* (2013.01); *G02B 27/0172* (2013.01); *G06T 5/006* (2013.01);
(Continued)

(58) Field of Classification Search
CPC .......... G09G 5/00; G09G 5/377; G09G 3/001; G02B 27/0179; G02B 27/0172;
(Continued)

(56) References Cited

U.S. PATENT DOCUMENTS 8,340,464 B2    12/2012  Watanabe et al.
2002/0084974 A1*  7/2002  Ohshima ............... A63F 13/00
                                                  345/156

(Continued)

FOREIGN PATENT DOCUMENTS

JP       2-23514 U      2/1990
JP     2002-272724 A    9/2002
(Continued)

OTHER PUBLICATIONS

International Search Report of PCT/JP2015/083849, dated Mar. 1, 2016. [PCT/ISA/210].

*Primary Examiner* — Jeff Piziali
(74) *Attorney, Agent, or Firm* — Sughrue Mion, PLLC

(57) ABSTRACT

This dynamic image processing device (20) for a head mounted display includes an attitude detection means (30) capable of detecting the attitude of an imaging device affixed to the head of a user, a first image deviation amount
(Continued)

calculation means (41) that calculates a first image deviation amount (G1) in the yawing and pitching directions of the imaging device based on the detection result of the attitude detection means, a second image deviation amount calculation means (42) that calculates a second image deviation amount (G2) between a past image (52) and a current frame image (51) based on the first image deviation amount, the current frame image captured by the imaging device, and the past image, and an image synthesis means (43) that corrects the past image based on the second image deviation amount and synthesizes the past image and the current frame image.

16 Claims, 8 Drawing Sheets

(51) Int. Cl.
| | | |
|---|---|---|
| *G09G 5/00* | (2006.01) | |
| *G06T 5/00* | (2006.01) | |
| *G09G 3/00* | (2006.01) | |
| *G06T 7/246* | (2017.01) | |

(52) U.S. Cl.
CPC .............. *G06T 7/248* (2017.01); *G09G 3/001* (2013.01); *G09G 5/00* (2013.01); *G09G 5/377* (2013.01); *G02B 2027/0181* (2013.01); *G02B 2027/0187* (2013.01); *G02B 2027/0198* (2013.01)

(58) Field of Classification Search
CPC .... G02B 2027/0187; G02B 2027/0198; G02B 2027/0181; G06T 5/006; G06T 7/248
See application file for complete search history.

(56) References Cited

U.S. PATENT DOCUMENTS

| | | | | |
|---|---|---|---|---|
| 2008/0297436 | A1* | 12/2008 | Oikawa | G02B 27/017 345/8 |
| 2011/0069175 | A1* | 3/2011 | Mistretta | G06T 5/50 348/164 |
| 2013/0241955 | A1* | 9/2013 | Tamaru | G02B 27/01 345/633 |
| 2013/0293583 | A1* | 11/2013 | Kashitani | G06F 3/011 345/633 |
| 2014/0111546 | A1* | 4/2014 | Utagawa | G02B 27/017 345/633 |
| 2014/0267420 | A1* | 9/2014 | Schowengerdt | G06F 3/012 345/633 |
| 2014/0285404 | A1* | 9/2014 | Takano | G06F 3/005 345/8 |
| 2015/0049115 | A1* | 2/2015 | Oikawa | G02B 27/017 345/633 |
| 2015/0057095 | A1* | 2/2015 | Leech | G01S 17/66 473/199 |
| 2015/0084841 | A1* | 3/2015 | Hilkes | G09G 5/00 345/8 |
| 2016/0155231 | A1* | 6/2016 | Raghoebardajal | G02B 27/017 382/195 |

FOREIGN PATENT DOCUMENTS

| | | | |
|---|---|---|---|
| JP | 2008-59204 A | | 3/2008 |
| JP | 2008059204 A | * | 3/2008 |
| JP | 2009085805 A | * | 4/2009 |
| JP | 2013-120988 A | | 6/2013 |
| JP | 2014-56595 A | | 3/2014 |
| WO | 2007/032156 A1 | | 3/2007 |
| WO | 2011/019461 A1 | | 2/2011 |

* cited by examiner

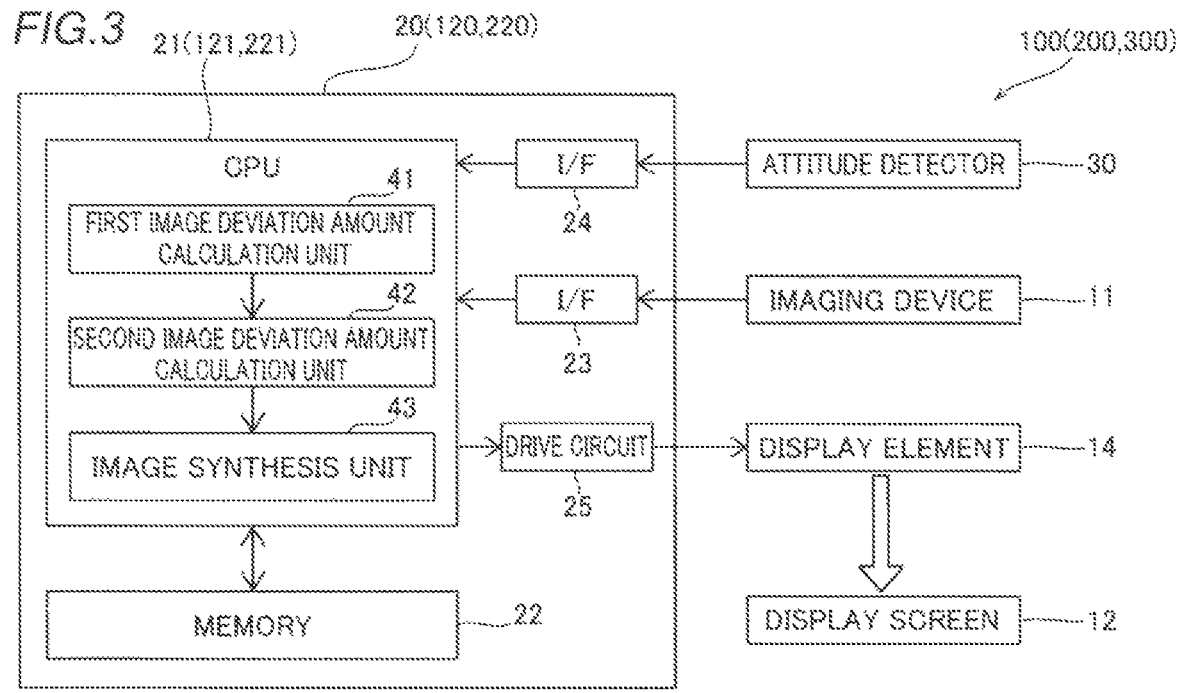
FIG.3
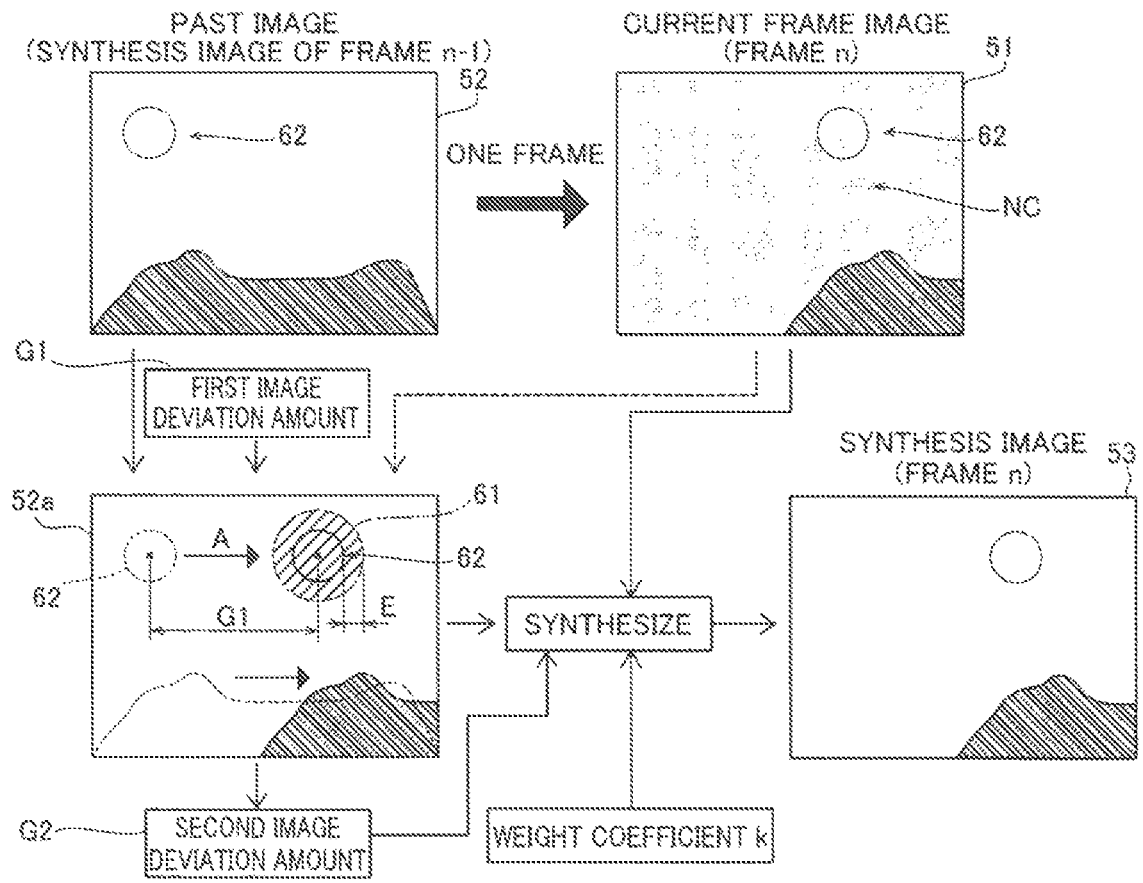
FIG.4 (FIRST EMBODIMENT)

FIG.5
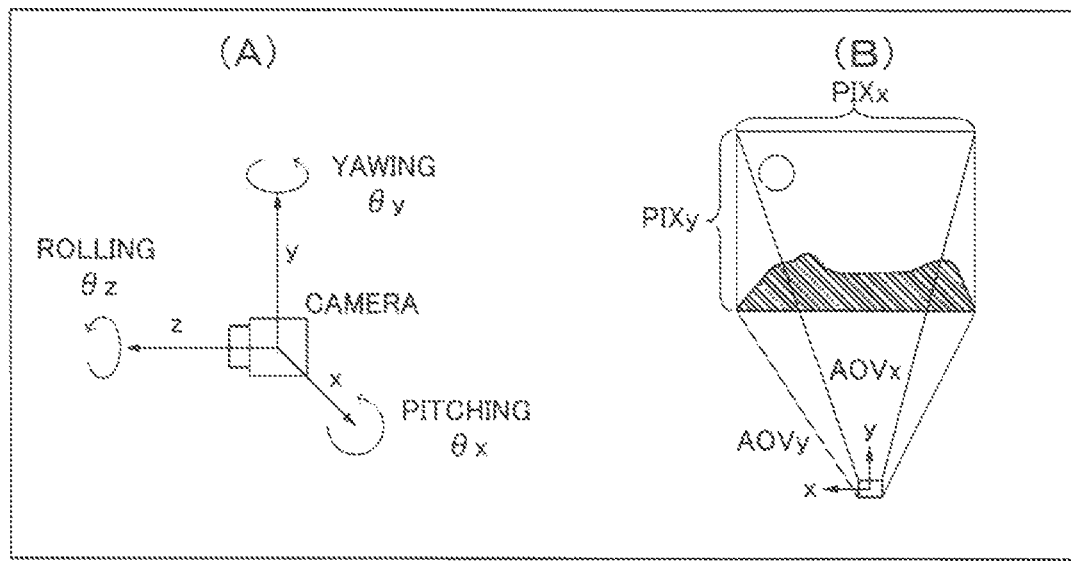
FIG.6
| DEGREE OF SIMILARITY | SMALL ⟶ LARGE |
| --- | --- |
| WEIGHT OF PAST IMAGE | SMALL ⟶ LARGE |
| WEIGHT OF CURRENT FRAME IMAGE | LARGE ⟶ SMALL |
FIG.7
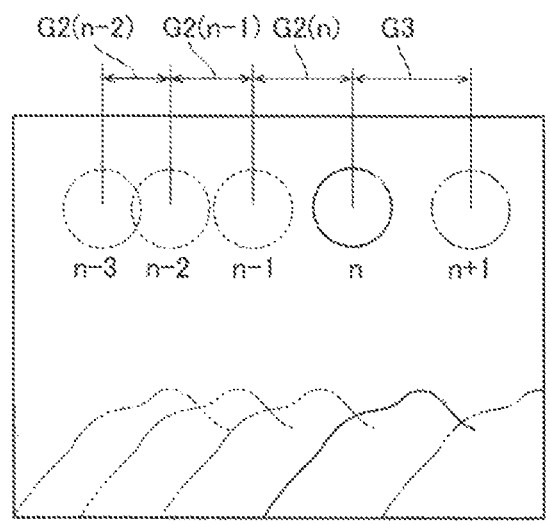

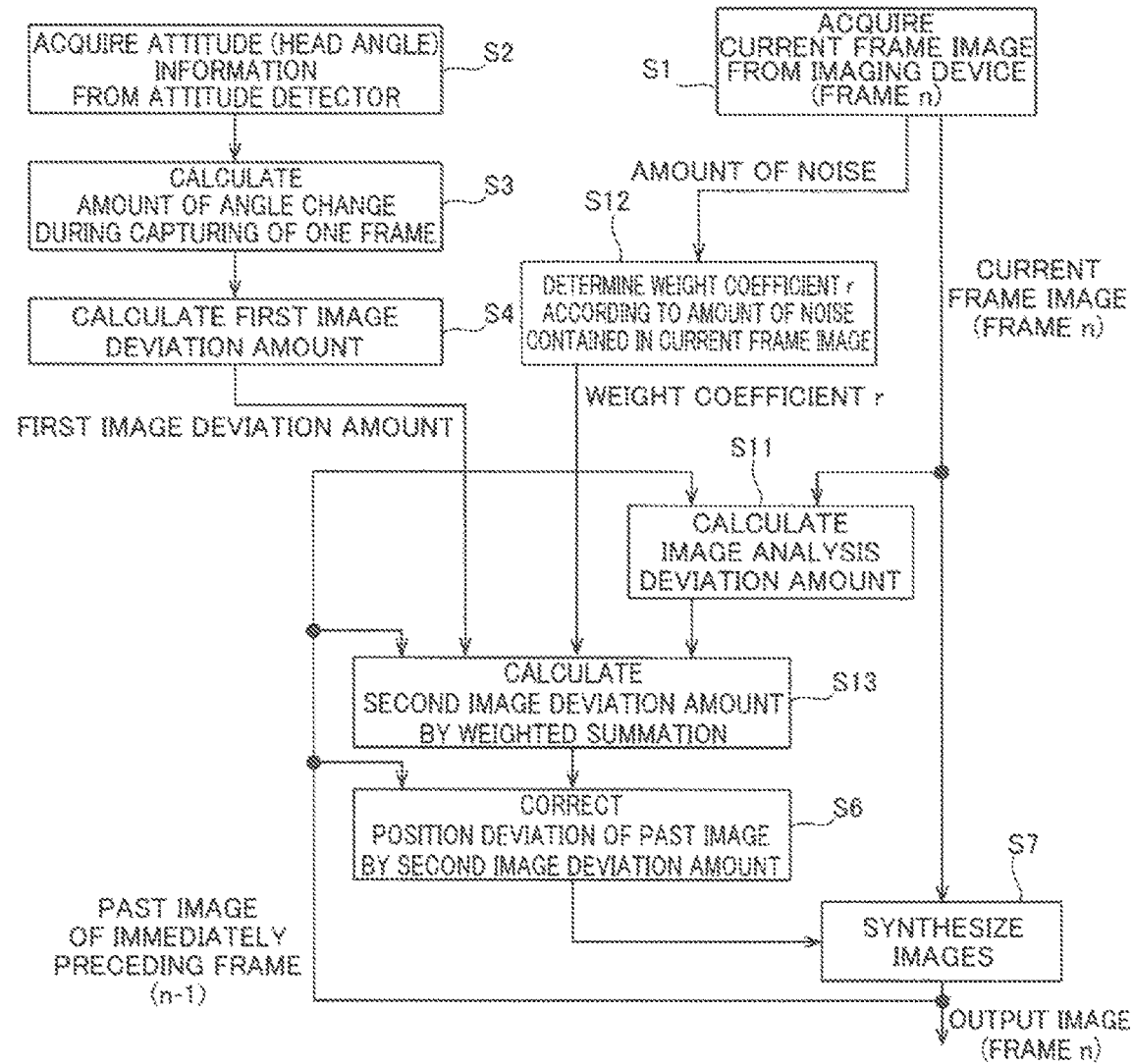
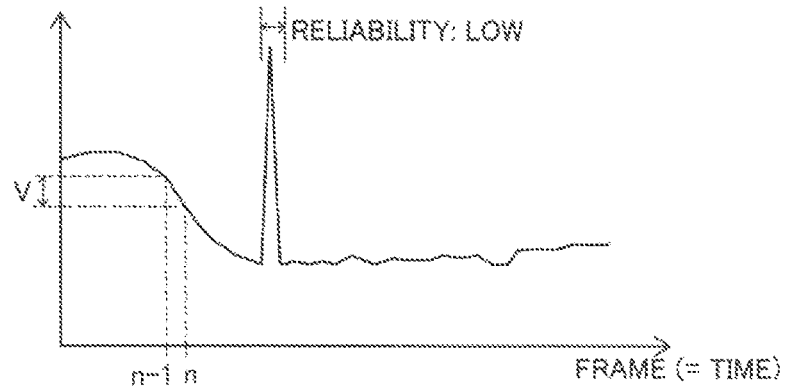

(THIRD EMBODIMENT) CONTROL PROCESSING OF DYNAMIC IMAGE PROCESSING DEVICE

DYNAMIC IMAGE PROCESSING DEVICE FOR HEAD MOUNTED DISPLAY, DYNAMIC IMAGE PROCESSING METHOD FOR HEAD MOUNTED DISPLAY AND HEAD MOUNTED DISPLAY SYSTEM

TECHNICAL FIELD

The present invention relates to a dynamic image processing device for a head mounted display, a dynamic image processing method for a head mounted display, and a head mounted display system.

BACKGROUND ART

In general, a dynamic image processing device that displays an image on a head mounted display, including an imaging device and a display screen is known. Such a dynamic image processing device is disclosed in Japanese Patent Laying-Open No. 2013-120988, for example.

The aforementioned Japanese Patent Laying-Open No. 2013-120988 discloses a head mounted display (HMD) including imaging devices and a display screen. This head mounted display is worn on the head of a user, and displays dynamic images captured by the imaging devices on the display screen for the user. The user can visually recognize the dynamic images captured by the imaging devices in a state where the dynamic images overlap with a view of the outside world transmitted and visible through the display screen.

It is known that noise is reduced by image processing using time direction filtering that synthesizes dynamic images in a time direction for improvement in visibility in this head mounted display. In the time direction filtering, when the imaging devices move or a moving body exists in the images, a residual image is generated after synthesis, and hence it is necessary to correct position deviation between frame images to be synthesized. The position deviation correction is performed by comparing the frame images to be synthesized with each other by image analysis.

PRIOR ART

Patent Document

Patent Document 1: Japanese Patent Laying-Open No. 2013-120988

SUMMARY OF THE INVENTION

Problems to be Solved by the Invention

However, when the position deviation of each frame image is corrected by the image analysis, the detection accuracy of the position deviation is reduced if the amount of noise of each frame image is large, for example, such that the residual image generated when the time direction filtering is performed may not be effectively suppressed, and hence an image analysis method having strength (robustness) to disturbances or environmental changes is required. Furthermore, when the dynamic images captured by the imaging devices are displayed on a visor or the like of a helmet, it is necessary to reduce a delay of image display as much as possible in order for the user not to have a feeling of strangeness due to temporal deviation between the dynamic images and an actual view at the time when the user views the images. However, when the calculation cost of image processing for noise reduction is increased, there is such a disadvantage that a delay of processing occurs. Thus, it is necessary to achieve both an effective noise reduction caused by improvement in the accuracy of position deviation detection and the robustness and ensuring of real time caused by a reduction in the calculation cost.

The present invention has been proposed in order to solve the aforementioned problems, and an object of the present invention is to provide a dynamic image processing device for a head mounted display, a dynamic image processing method for a head mounted display, and a head mounted display system each capable of improving the accuracy of position deviation detection and the robustness and suppressing an increase in the calculation cost of image processing.

Means for Solving the Problems

In order to attain the aforementioned object, a dynamic image processing device for a head mounted display according to a first aspect of the present invention is a dynamic image processing device for a head mounted display worn on the head of a user and including an imaging device that captures an image at a predetermined frame interval and a display screen, and includes an attitude detection means capable of detecting the attitude of the imaging device affixed to the head of the user, a first image deviation amount calculation means that calculates a first image deviation amount in the yawing and pitching directions of the imaging device between frames captured by the imaging device based on the detection result of the attitude detection means, a second image deviation amount calculation means that calculates a second image deviation amount between a past image and a current frame image based on the first image deviation amount, the current frame image captured by the imaging device, and the past image based on one or a plurality of frame images captured by the imaging device in the past, and an image synthesis means that corrects the past image based on the second image deviation amount and synthesizes the past image that is corrected and the current frame image.

As hereinabove described, the dynamic image processing device for the head mounted display according to the first aspect of the present invention includes the first image deviation amount calculation means that calculates the first image deviation amount in the yawing and pitching directions of the imaging device between the frames captured by the imaging device based on the detection result of the attitude detection means, and the second image deviation amount calculation means that calculates the second image deviation amount between the past image and the current frame image based on the first image deviation amount, the current frame image captured by the imaging device, and the past image based on one or the plurality of frame images captured by the imaging device in the past. Thus, when the second image deviation amount between the past image and the current frame image is calculated, the first image deviation amount based on a change in the attitude of the imaging device detected by the attitude detection means can be utilized, and hence a reduction in the accuracy of position deviation detection can be suppressed even when the sufficient accuracy of position deviation detection is not obtained with image analysis due to noise. Unlike the case where positional correction is performed by only the first image deviation amount, the accuracy of position deviation detection can be ensured by calculating the second image deviation amount even when the detection result of the attitude detection means contains a few errors, and hence the robustness can be improved. Furthermore, the first image deviation amount in the yawing and pitching directions of the imaging device is calculated such that the calculation cost for position deviation detection can be reduced as compared with the case where position deviation including position deviation in a rolling direction is considered. Consequently, the accuracy of position deviation detection and the robustness can be improved, and an increase in the calculation cost of image processing can be suppressed.

In the aforementioned dynamic image processing device for the head mounted display according to the first aspect, the second image deviation amount calculation means preferably calculates the second image deviation amount from the current frame image in a position deviation searching region set for a portion of the past image, and the position and size of the position deviation searching region in the past image are preferably set based on the first image deviation amount. According to this structure, the position deviation searching region can be narrowed down to a predetermined range centered at a position after movement by the first image deviation amount, for example, utilizing the first image deviation amount. Consequently, the calculation cost can be effectively reduced by narrowing down the position deviation searching region while the accuracy of position deviation detection is ensured, as compared with the case where position deviation is searched over the entire past image.

In this case, the position deviation searching region is preferably set in a region expanded by a range that corresponds to an error range of the first image deviation amount around the portion of the past image after movement by the first image deviation amount. According to this structure, the position deviation searching region can be restricted to a minimum range in which the error range of the first image deviation amount has been considered, and hence the calculation cost can be more effectively reduced.

In the aforementioned dynamic image processing device for the head mounted display according to the first aspect, the second image deviation amount calculation means preferably analyzes the past image and the current frame image to calculate an image analysis deviation amount between the past image and the current frame image, and calculates the second image deviation amount based on the first image deviation amount and the image analysis deviation amount. According to this structure, the second image deviation amount can be calculated in consideration of both the first image deviation amount based on the detection result of the attitude detection means and the image analysis deviation amount obtained by image analysis. Therefore, even when it is difficult to obtain the accuracy of the image analysis deviation amount due to the noise of the current frame image or even when noise is generated in the detection result of the attitude detection and it is difficult to obtain the accuracy of the first image deviation amount, for example, the detection accuracy of the first image deviation amount and the detection accuracy of the image analysis deviation amount are allowed to complement each other, and hence the accuracy of position deviation detection and the robustness can be effectively improved.

In this case, the second image deviation amount calculation means preferably calculates the second image deviation amount by performing a weighted sum of the first image deviation amount and the image analysis deviation amount according to the amount of noise of the current frame image. According to this structure, when the amount of noise of the current frame image is large, for example, the accuracy of position deviation detection can be ensured by heavily weighting the first image deviation amount. When the amount of noise is small and the accuracy of the image analysis deviation amount is obtained, further improvement in the accuracy of position deviation detection can also be expected by heavily weighting the image analysis deviation amount as compared with the case of the first image deviation amount alone. Consequently, the accuracy of position deviation detection and the robustness can be more effectively improved.

In the aforementioned structure in which a weighted sum of the first image deviation amount and the image analysis deviation amount is performed according to the amount of noise of the current frame image, the second image deviation amount calculation means preferably increases the weight of the first image deviation amount as the amount of noise of the current frame image becomes larger. According to this structure, when the amount of noise of the current frame image is small, the weight of the image analysis deviation amount that enables obtaining high accuracy can be increased, and the first image deviation amount can be more heavily weighted as the amount of noise of the current frame image is larger and it is more difficult to obtain the accuracy of the image analysis deviation amount. Consequently, the accuracy of position deviation detection and the robustness can be reliably improved.

In the aforementioned dynamic image processing device for the head mounted display according to the first aspect, the second image deviation amount calculation means preferably performs position correction on the past image based on the first image deviation amount, and calculates the second image deviation amount between the past image on which the position correction has been performed and the current frame image for each local region in the image, and the image synthesis means preferably corrects, based on the second image deviation amount, the position of each local region of the past image on which the position correction has been performed, and synthesizes the past image that is corrected and the current frame image. According to this structure, the position of each local region can be locally corrected based on the second image deviation amount, and hence even when a moving body is reflected in the entire image, for example, the noise of the entire image can be reduced while local remaining of a residual image in an image portion in which the moving body is reflected is suppressed.

In the aforementioned dynamic image processing device for the head mounted display according to the first aspect, the first image deviation amount calculation means preferably calculates the first image deviation amount based on the detection result of the attitude detection means and an estimate image deviation amount estimated from the history of the second image deviation amount calculated in the past. Deviation of the images of the frames captured by the imaging device has time-series continuity, and hence when the range of the image position deviation amount of the current frame image can be estimated from the history of the second image deviation amount. Thus, according to the above structure, the estimate image deviation amount is considered such that the detection accuracy of the first image deviation amount can be ensured even when noise is introduced into the detection result of the attitude detection means and an outlier deviated from another detected value is detected, for example. Furthermore, the estimate image deviation amount is calculated in advance such that the first image deviation amount can be promptly calculated, and hence occurrence of a delay of processing can be suppressed even when the estimate image deviation amount is used.

In the aforementioned dynamic image processing device for the head mounted display according to the first aspect, the image synthesis means preferably calculates the degree of similarity between the past image that is corrected and the current frame image for each local region in the image, and synthesizes the past image that is corrected and the current frame image by weighting according to the degree of similarity that is calculated. According to this structure, when the degree of similarity becomes low although position adjustment is performed, for example, the current frame image is heavily weighted such that an output image in which a more current state (current frame image) is reflected can be generated.

In this case, the image synthesis means preferably makes the weight of the past image that is corrected larger than that of the current frame image as the degree of similarity between the past image that is corrected and the current frame image increases. According to this structure, when there is no change in the state of the outside world between the frames of the past image and the current frame image (the degree of similarity is high), the weight of the current frame image containing noise can be reduced for synthesis, and hence the noise can be more effectively reduced.

In the aforementioned dynamic image processing device for the head mounted display according to the first aspect, the image synthesis means preferably synthesizes the past image that is corrected and the current frame image by recursive filtering. The recursive filtering is processing for synthesizing the past image and the current frame image by performing a weighted sum of the current frame image and the immediately preceding past image. According to this structure, it is only required to perform a weighted sum of two images, and hence the calculation cost can be effectively reduced.

In the aforementioned dynamic image processing device for the head mounted display according to the first aspect, the image synthesis means preferably outputs, to the display screen, a synthesis image obtained by synthesis as an output image of a current frame that corresponds to the current frame image, and stores the synthesis image as the past image in a next frame. According to this structure, synthesis can be performed with the synthesis image obtained in an immediately preceding frame having a minimum deviation from the current frame image, and hence the calculation cost can be reduced.

In the aforementioned dynamic image processing device for the head mounted display according to the first aspect, the first image deviation amount calculation means preferably excludes image deviation caused by translation of the imaging device, and calculates the first image deviation amount caused by rotation of the imaging device. In the case of the image deviation caused by the translation of the imaging device, the positional relationship between a distant object and a nearby object is changed, and hence it is difficult to correct the same as entire image position deviation. On the other hand, in the case of the head mounted display that a pilot of an airplane or the like uses, for example, the pilot frequently rotates his or her head, and the influence of the position deviation caused by the translation is relatively small. Thus, the first image deviation amount calculation means excludes the image deviation caused by the translation, takes into account only the rotational position deviation, and calculates the first image deviation amount such that the calculation cost can be reduced while an influence on the accuracy of position deviation detection is effectively suppressed.

In the aforementioned dynamic image processing device for the head mounted display according to the first aspect, the first image deviation amount calculation means preferably excludes rotational position deviation of the imaging device in a rolling direction, and calculates the first image deviation amount in yawing and pitching directions of the imaging device. In the head mounted display, rotation in the rolling direction corresponds to movement of the neck of the user titled to the right and left, and is less frequent than movement in the yawing (head shaking to the right and left) and pitching (head shaking up and down) directions. Thus, the first image deviation amount calculation means excludes the deviation in the rolling direction, takes into account only the deviation in the yawing and pitching directions, and calculates the first image deviation amount such that the calculation cost can be reduced while an influence on the accuracy of position deviation detection is effectively suppressed.

A dynamic image processing method for a head mounted display according to a second aspect of the present invention is a dynamic image processing method for a head mounted display worn on the head of a user and including an imaging device that captures an image at a predetermined frame interval and a display screen, and includes detecting the attitude of the imaging device affixed to the head of the user, calculating a first image deviation amount in the yawing and pitching directions of the imaging device between frames captured by the imaging device based on the detection result of the attitude of the imaging device, calculating a second image deviation amount between a past image and a current frame image based on the first image deviation amount, the current frame image captured by the imaging device, and the past image based on one or a plurality of frame images captured by the imaging device in the past, and correcting the past image based on the second image deviation amount and synthesizing the past image that is corrected and the current frame image.

As hereinabove described, the dynamic image processing method for the head mounted display according to the second aspect of the present invention includes calculating the first image deviation amount in the yawing and pitching directions of the imaging device between the frames captured by the imaging device based on the detection result of the attitude of the imaging device, and calculating the second image deviation amount between the past image and the current frame image based on the first image deviation amount, the current frame image captured by the imaging device, and the past image based on one or the plurality of frame images captured by the imaging device in the past. Thus, when the second image deviation amount between the past image and the current frame image is calculated, the first image deviation amount based on a change in the detected attitude of the imaging device can be utilized, and hence a reduction in the accuracy of position deviation detection can be suppressed even when the accuracy of position deviation detection is not obtained with image analysis due to noise. Unlike the case where positional correction is performed by only the first image deviation amount, the accuracy of position deviation detection can be ensured by calculating the second image deviation amount even when the attitude detection result contains a few errors, and hence the robustness can be improved. Furthermore, the first image deviation amount in the yawing and pitching directions of the imaging device is calculated such that the calculation cost for position deviation detection can be reduced as compared with the case where position deviation including position deviation in a rolling direction is considered. Consequently, the accuracy of position deviation detection and the robustness can be improved, and an increase in the calculation cost of image processing can be suppressed.

A head mounted display system according to a third aspect of the present invention includes a head mounted display worn on the head of a user and including an imaging device that captures an image at a predetermined frame interval and a display screen, an attitude detector capable of detecting the attitude of the imaging device affixed to the head of the user, and a dynamic image processing device that displays the image captured by the imaging device on the display screen, and the dynamic image processing device includes a first image deviation amount calculation means that calculates a first image deviation amount in the yawing and pitching directions of the imaging device between frames captured by the imaging device based on the detection result of the attitude detector, a second image deviation amount calculation means that calculates a second image deviation amount between a past image and a current frame image based on the first image deviation amount, the current frame image captured by the imaging device, and the past image based on one or a plurality of frame images captured by the imaging device in the past, and an image synthesis means that corrects the past image based on the second image deviation amount and synthesizes the past image that is corrected and the current frame image.

As hereinabove described, the head mounted display system according to the third aspect of the present invention includes the dynamic image processing device including the first image deviation amount calculation means that calculates the first image deviation amount in the yawing and pitching directions of the imaging device between the frames captured by the imaging device based on the detection result of the attitude detector, and the second image deviation amount calculation means that calculates the second image deviation amount between the past image and the current frame image based on the first image deviation amount, the current frame image captured by the imaging device, and the past image based on one or the plurality of frame images captured by the imaging device in the past. Thus, when the second image deviation amount between the past image and the current frame image is calculated, the first image deviation amount based on a change in the detected attitude of the imaging device can be utilized, and hence a reduction in the accuracy of position deviation detection can be suppressed even when the accuracy of position deviation detection is not obtained with image analysis due to noise. Unlike the case where positional correction is performed by only the first image deviation amount based on the attitude detection result, the accuracy of position deviation detection can be ensured by calculating the second image deviation amount even when the attitude detection result contains a few errors, and hence the robustness can be improved. Furthermore, the first image deviation amount only in the yawing and pitching directions is calculated such that the calculation cost for position deviation detection can be reduced as compared with the case where position deviation including position deviation in a rolling direction is considered. Consequently, the accuracy of position deviation detection and the robustness can be improved, and an increase in the calculation cost of image processing can be suppressed.

Effect of the Invention

As hereinabove described, according to the present invention, the accuracy of position deviation detection and the robustness can be improved, and an increase in the calculation cost of image processing can be suppressed.

BRIEF DESCRIPTION OF THE DRAWINGS

FIG. 3 A block diagram showing the control configuration of the dynamic image processing device according to the first embodiment of the present invention.

FIG. 4 A conceptual diagram for illustrating image processing of the dynamic image processing device according to the first embodiment of the present invention.

FIG. 5 View (A) is a schematic view showing a coordinate system for showing the attitude of an imaging device. View (B) is a schematic view showing a coordinate system in an image.

FIG. 6 A diagram showing an example of weight setting based on the degree of similarity between a current frame image and a past image.

FIG. 7 A schematic view showing an estimate image deviation amount.

FIG. 11 A flowchart for illustrating control processing of the dynamic image processing device according to the second embodiment of the present invention.

FIG. 12 A diagram showing a modification of weight setting of a first image deviation amount and an image analysis deviation amount.

MODES FOR CARRYING OUT THE INVENTION

Embodiments embodying the present invention are hereinafter described on the basis of the drawings.

First Embodiment

The overall configuration of a head mounted display system (hereinafter referred to as an "HMD system") 100 according to a first embodiment of the present invention is now described with reference to FIGS. 1 to 8. In the first embodiment, an example of mounting the HMD system 100 on a movable body 1 that moves across the sky (in the air), such as particularly an aircraft (an airplane or a helicopter), of movable bodies that carry persons such as a motor vehicle, an aircraft, and a marine vessel and move is described.

[Overall Configuration of Head Mounted Display System]

Figure 1:
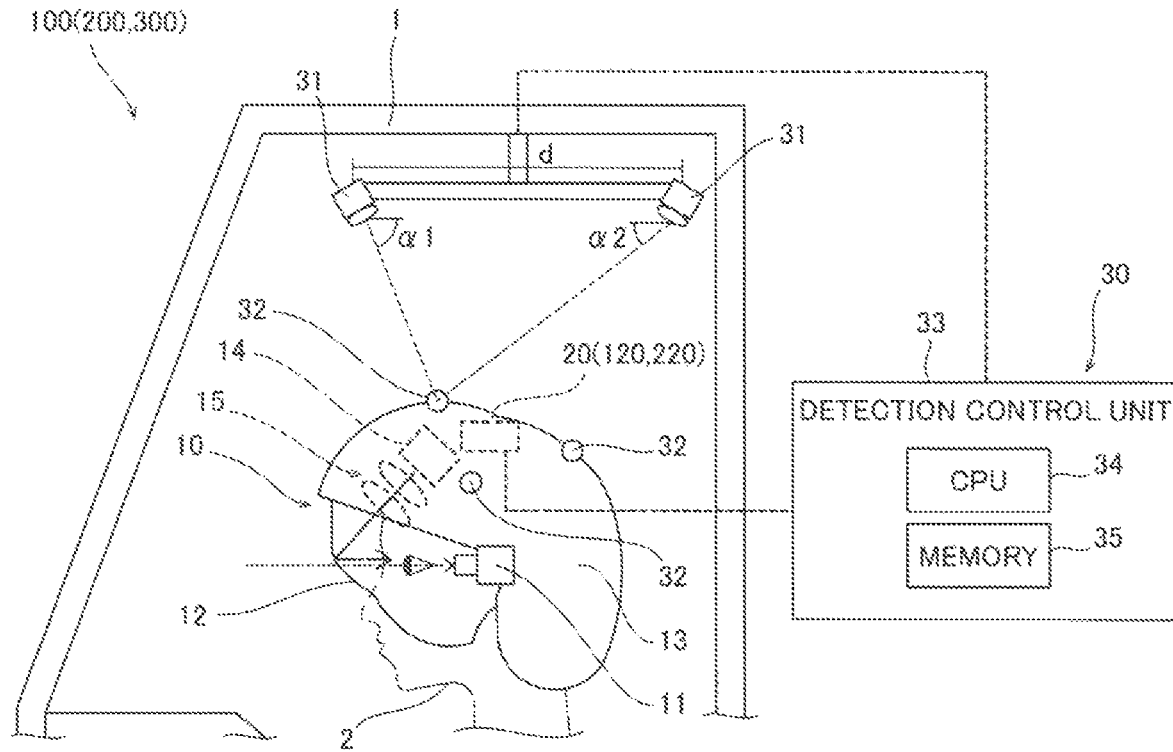
FIG. 1 A schematic view showing the overall configuration of a head mounted display system according to a first embodiment of the present invention.

As shown in FIG. 1, the HMD system 100 according to the first embodiment includes a head mounted display (hereinafter referred to as an "HMD") 10 including imaging devices 11 and a display screen 12, a dynamic image processing device 20 that displays images captured by the imaging devices 11 on the display screen 12, and an attitude detector 30 capable of detecting the attitudes of the imaging devices 11. The attitude detector 30 is an example of an "attitude detection means" in the present invention.

The HMD system 100 displays dynamic images captured by the imaging devices 11 on the display screen 12 of the HMD 10 such that a user is allowed to visually recognize the dynamic images displayed on the imaging device 12 in a state where the dynamic images overlap with a view transmitted through the display screen 12 to be visually recognized. Thus, the HMD system 100 can complement a field of view of the user with the dynamic images captured by the imaging devices 11 that are more highly sensitive than the naked eye under an environment of low illuminance in which it is difficult to understand the outside world with the naked eye, such as early evening or night, and can display various types of information in a state where the information overlaps with an object transmitted through the display screen 12 to be visually recognized. According to the first embodiment, the user is a crew (pilot) or the like of the movable body 1 (aircraft).

The HMD 10 is a head-mounted display device worn on the head 2 of the user, including the imaging devices 11 and the display screen 12. FIG. 1 shows an example of the helmet-style HMD 10. The HMD 10 includes a helmet 13, the visor-shaped display screen 12, and the imaging devices 11, and the display screen 12 and the imaging devices 11 are mounted on the helmet 13. The HMD 10 also includes display elements 14 and optical systems 15 for projecting images onto the display screen 12.

Figure 2:
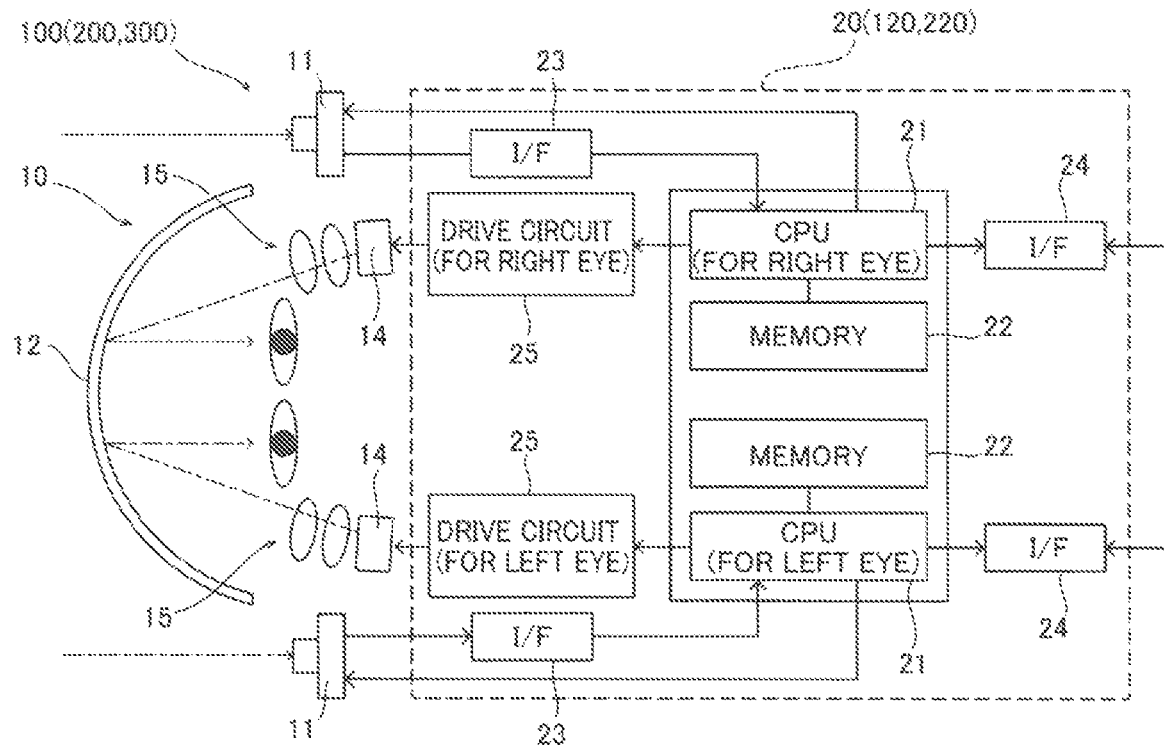
FIG. 2 A block diagram showing a head mounted display and a dynamic image processing device according to the first embodiment of the present invention.

The display screen 12 has translucency, and the user can visually recognize a view in the forward line of sight through the display screen 12. As shown in FIG. 2, the imaging devices 11 each include a lens and an imaging element, which are not shown, and a pair of imaging devices 11 is provided on both sides of the helmet 13 (see FIG. 1) for right and left images. The respective imaging devices 11 are fixed such that the capturing optical axis directions thereof coincide with each other in the forward line of sight of the user (in a forward direction perpendicular to a right-left direction that connects a pair of cameras). A pair of display elements 14 is provided, causes a pair of optical systems 15 to collimate a left eye image and a right eye image, respectively, and projects the images onto the display screen 12. The left eye image and the right eye image reflected by the display screen 12 overlap with outside world light externally transmitted through the display screen 12, and are visually recognized by the left eye and the right eye of the user, respectively. Markers 32 to be detected by the attitude detector 30 are attached to the helmet 13 shown in FIG. 1.

The dynamic image processing device 20 is incorporated in the helmet 13 as a processor for video signals of the HMD 10. The dynamic image processing device 20 has a function of displaying dynamic images on the display screen 12 by receiving the dynamic images captured by the imaging devices 11, performing image processing, and outputting the dynamic images to the display elements 14. As shown in FIG. 2, the dynamic image processing device 20 includes CPUs 21 as control units of the dynamic image processing device 20, memories 22, first interface sections 23, second interface sections 24, and drive circuits 25. These CPUs 21, memories 22, first interface sections 23, second interface sections 24, and drive circuits 25 are provided in pairs for a left eye image and a right eye image.

The CPUs 21 execute programs stored in the memories 22 to control the imaging devices 11 and the display elements 14 and perform predetermined image processing on the captured dynamic images. In other words, the CPUs 21 receive the dynamic images captured by the imaging devices 11 through the first interface sections 23, generate video signals, and output the video signals to the drive circuits 25. Furthermore, the CPUs 21 acquire detection signals (detection results) of the attitude detector 30 through the second interface sections 24 and perform image processing on the dynamic images with the detection signals. The image processing performed by the CPUs 21 is described in detail later.

The first interface sections 23 are connected to the imaging devices 11, and transmit the video signals of the dynamic images captured by the imaging devices 11 to the CPUs 21. The second interface sections 24 are connected to the attitude detector 30 with or without wires, and transmit the detection signals of the attitude detector 30 to the CPUs 21. The drive circuits 25 are circuits for driving the display elements 14 based on the video signals transmitted from the CPUs 21.

As shown in FIG. 1, the attitude detector 30 detects the attitudes of the imaging devices 11 fixed to the helmet 13 by detecting the attitude of the helmet 13 worn on the head 2 of the user. According to the first embodiment, the attitude detector 30 is provided outside the HMD 10 (helmet 13), and optically detects the attitudes of the imaging devices 11 from outside the HMD 10 (helmet 13).

The attitude detector 30 includes a pair of cameras 31 (stereo cameras), the markers 32 attached to the head of the user, and a detection control unit 33. The pair of cameras 31 is fixedly mounted on the movable body 1 that the user boards. The pair of cameras 31 is located at predetermined positions spaced from each other to image the markers 32 from different directions from each other.

The markers 32 are light-emitting elements such as LEDs, and three or more markers 32 are provided such that the three-dimensional attitudes of the imaging devices 11 (helmet 13) are determinable. The respective markers 32 are fixedly mounted at positions on a surface of the helmet 13 capable of being captured by the cameras 31.

The detection control unit 33 is a computer including a CPU 34 and a memory 35. The CPU 34 executes a program stored in the memory 35 to perform attitude detection processing. The memory 35 stores information about a positional relationship between the pair of cameras 31 (a distance d between the cameras), information (relative position coordinates) about a relative positional relationship between the three or more markers 32, etc.

The CPU 34 extracts each marker 32 from images imaged by the cameras 31 and calculates direction angles $\alpha 1$ and $\alpha 2$ of each marker 32 with respect to the respective cameras 31. The CPU 34 calculates spatial position coordinates of each marker 32 based on the principle of triangulation with the direction angles $\alpha 1$ and $\alpha 2$ of each marker 32 with respect to the pair of cameras 31 and the distance d between the pair of cameras 31. Each marker 32 is fixed to the helmet 13 in predetermined relative position coordinates, and hence the CPU 34 calculates the current angle (attitude) of the helmet 13 based on the spatial position coordinates of the three or more markers 32 and the relative position coordinates between the markers. The relative positional relationship of the imaging devices 11 with respect to the helmet 13 is also already-known, and hence the current angles (attitudes) of the imaging devices 11 can be calculated from the current angle (attitude) of the helmet 13.

The attitude detector 30 detects the attitudes of the imaging devices 11 affixed to the head 2 of the user of the imaging devices 11 in this manner. The attitude detector 30 transmits the detection signals of the detected attitudes of the imaging devices 11 to the dynamic image processing device 20 through the second interface sections 24. The attitude detector 30 can employ the configuration etc. disclosed in Japanese Patent Laying-Open No. 2008-59204, for example, and hence the detailed description is omitted.

[Detailed Configuration of Dynamic Image Processing Device]

The detailed configuration of the dynamic image processing device 20 related to image processing is now described. When control processing performed by the CPUs 21 of the dynamic image processing device 20 is described as a functional block, as shown in FIG. 3, the CPUs 21 each include a first image deviation amount calculation unit 41, a second image deviation amount calculation unit 42, and an image synthesis unit 43. The first image deviation amount calculation unit 41, the second image deviation amount calculation unit 42, and the image synthesis unit 32 are examples of a "first image deviation amount calculation means", a "second image deviation amount calculation means", and an "image synthesis means" in the present invention, respectively.

Referring to FIGS. 3 and 4, the first image deviation amount calculation unit 41 calculates a first image deviation amount G1 between frames captured by a corresponding imaging device 11 based on the detection result of the attitude detector 30. The first image deviation amount G1 is an image position deviation amount between a latest current frame image 51 captured by the corresponding imaging device 11 and an immediately preceding past image 52 displayed on the display screen 12 one frame before (an output image output in an immediately preceding frame).

Specifically, the first image deviation amount calculation unit 41 calculates the amount of change in the attitude (head angle) of the corresponding imaging device 11 during a period in which the corresponding imaging device 11 captures one frame from the detection result of the attitude detector 30. When the frame rate of the imaging device 11 is 60 fps (frames per second), for example, the amount of angle change in the attitude (head angle) for 1/60 seconds is calculated.

Then, the first image deviation amount calculation unit 41 converts the calculated amount of angle change into an image deviation amount during one frame. According to the first embodiment, the first image deviation amount calculation unit 41 excludes image deviation caused by translation of the corresponding imaging device 11, and calculates only an image deviation amount caused by rotation of the corresponding imaging device 11. This is because, whereas in the case of the image deviation caused by the rotation of the corresponding imaging device 11, the positional relationship between a distant object and a nearby object is not changed but a picture plane (angle of view) is only changed, in the case of the image deviation caused by the translation of the corresponding imaging device 11, the positional relationship between a distant object and a nearby object is changed (position deviation is increased as an object is closer to the corresponding imaging device 11) such that it is difficult to consider the image deviation caused by the translation of the corresponding imaging device 11 as entire image position deviation. Furthermore, in the case of the user (pilot) that boards the movable body 1 such as an airplane, the user frequently rotates his or her head 2 and observes a distant view, and hence the influence of the position deviation caused by the translation is relatively small. Thus, an approximation that ignores the image deviation caused by the translation of the corresponding imaging device 11 sufficiently holds, and the calculation cost can be reduced.

According to the first embodiment, the first image deviation amount calculation unit 41 calculates the first image deviation amount G1 in the yawing and pitching directions of the corresponding imaging device 11, as shown in view (A) of FIG. 5. In other words, rotational position deviation in the rolling direction is excluded. In the case of the HMD, rotation in the rolling direction corresponds to movement of the neck of the user titled to the right and left. The movement of the head 2 of the user during boarding of the movable body 1 is dominant in the yawing (head shaking to the right and left) and pitching (head shaking up and down) directions, and the movement in the rolling direction is less frequent. Thus, even if the rotational position deviation in the rolling direction is excluded, the position deviation of an image is hardly influenced.

Thus, when the coordinates of the immediately preceding past image 52 one frame before are set as (Xpre, Ypre) and the coordinates of the current image 51 are set as (Xpos, Ypos), coordinates after change in the first image deviation amount G1 caused by the angle change are expressed by the following formula (1).

[Formula 1]

$$\begin{pmatrix} x_{pos} \\ y_{pos} \end{pmatrix} = \begin{pmatrix} x_{pre} + \dfrac{\Delta\theta_y}{AOV_x} \times PIX_x \\ y_{pre} + \dfrac{\Delta\theta_x}{AOV_y} \times PIX_y \end{pmatrix} \quad (1)$$

As shown in view (B) of FIG. 5, AOVx [°] and AOVy [°] are the viewing angle of the corresponding imaging device 11, and PIXx [pixel] and PIXy [pixel] are the number of pixels. $\Delta\theta x$ [°] and $\Delta\theta y$ [°] are the amount of angle change in the corresponding imaging device 11. A central predetermined position between the cameras 31 of the attitude detector 30 (see FIG. 1) is set as an original point of a rotating coordinate system. The second term in the right side corresponds to the first image deviation amount G1.

As shown in FIGS. 3 and 4, the second image deviation amount calculation unit 42 calculates a second image deviation amount G2 between the past image 52 and the current frame image 51 based on the first image deviation amount G1, the current frame image 51 captured by the corresponding imaging device 11, and the past image 52 (the output image output in the immediately preceding frame) based on one or a plurality of frame images captured by the corresponding imaging device 11 in the past.

As a method for calculating the position deviation amount between the past image 52 and the current frame image 51, a publicly known method for performing image analysis can be employed. A method for calculating the position deviation amount is pattern matching, for example, and a method for calculating a deviation amount with mutual correlation on the past image 52 and the current frame image 51, a phase-only correlation method for converting the past image 52 and the current frame image 51 into a frequency domain and calculating a deviation amount based on phase correlation in a frequency space, or the like can be used. In the calculation of a deviation amount by image analysis, a deviation amount can be calculated for each local region of the image by performing the above processing for each local region of the image.

According to the first embodiment, the second image deviation amount calculation unit 42 calculates the second image deviation amount G2 from the current frame image 51 in a position deviation searching region 61 set for a portion of the past image 52, and the position and size of the position deviation searching region 61 in the past image 52 are set based on the first image deviation amount G1.

Specifically, assume that the first image deviation amount G1 in a direction A is calculated with respect to the past image 52 in FIG. 4. In this case, when attention is directed to an image portion 62 of the past image 52, for example, the past image 52 conceivably matches the current frame image 51 by moving the image portion 62 in the direction A by the first image deviation amount G1 as in an image 52a. However, a predetermined error range actually exists in the first image deviation amount G1 based on the detection result of the attitude detector 30. Thus, the position deviation searching region 61 is set in a region centered at the position (the position in the image 52a) after the movement by the first image deviation amount G1 and expanded by a range E that corresponds to the error range of the first image deviation amount G1 around the image portion 62.

The second image deviation amount calculation unit 42 calculates the second image deviation amount G2 between the past image 52 and the current frame image 51 as a result of pattern matching in the position deviation searching region 61.

Then, the image synthesis unit 43 (see FIG. 3) corrects the position deviation of the past image 52 based on the second image deviation amount G2 and synthesizes the corrected past image 52 and the current frame image 51. In other words, the image synthesis unit 43 corrects the immediately preceding past image 52 by the second image deviation amount G2, and thereafter synthesizes the corrected past image 52 with the current frame image 51.

According to the first embodiment, the image synthesis unit 43 synthesizes the corrected past image 52 and the current frame image 51 by recursive filtering. The recursive filtering is processing for synthesizing the corrected past image 52 and the current frame image 51 by performing a weighted sum of the past image 52 and the current frame image 51. A generated synthesis image Qn is expressed by the following formula (2) where Pn represents the current image 51, Qn−1 represents the past image 52, and k represents a weight coefficient.

$$Qn(i,j) = k \times Pn(i,j) + (1-k) \times Qn-1(i,j) \quad (2)$$

Note that i and j are pixels in a direction X and direction Y in an image, respectively.

As a result of the synthesis processing, a synthesis image 53 is obtained. The dynamic image processing device 20 outputs the synthesis image 53 synthesized by the image synthesis unit 43 as an output image of a current frame that corresponds to the current frame image 51, which is a captured image, to a corresponding display element 14 of the HMD 10. Consequently, when the current frame image 51 contains noise NC (see FIG. 4), the synthesis image 53, the noise NC of which has been reduced, is displayed. The synthesis image 53 is stored in the memories 22, and in a next frame, the synthesis image 53 is utilized as the past image 52 of the immediately preceding frame. In other words, the past image 52 shown in FIG. 4 is the synthesis image 53 synthesized and output one frame before.

According to the first embodiment, the image synthesis unit 43 preferably calculates the degree of similarity between the corrected past image 52 and the current frame image 51 for each local region in the image and synthesizes the corrected past image 52 and the current frame image 51 by weighting according to the calculated degree of similarity. In other words, the image synthesis unit 43 makes the weight of the past image 52 larger than that of the current frame image 51 as the degree of similarity between the past image 52 after position deviation correction and the current frame image 51 increases, as shown in FIG. 6. Therefore, as shown in the above formula (2), the weight coefficient k varies for each group of pixels that belongs to the local region when synthesis processing is performed. The degree of similarity is determined by calculating a correlation function, for example, and becomes large when a correlation between the corrected past image 52 and the current frame image 51 is high.

Thus, when the degree of similarity is high, the synthesis percentage of the past image 52, the noise NC of which has been reduced by synthesis processing, becomes larger than that of the current frame image 51 containing noise NC, and hence the noise NC is further reduced. When the degree of similarity is low, on the other hand, the image synthesis unit 43 makes the weight of the past image 52 smaller than that of the current frame image 51. Thus, the synthesis percentage of the current frame image 51 becomes larger than that of the past image 52 in which a change exists as viewed from the current frame (the degree of similarity is low), and hence the synthesis image 53 in which a current status is accurately reflected is obtained. As an example, when a blinking light source is reflected in the local region, is in an off-state in the past image 52, and is in an on-state in the current frame image 51, for example, the current frame image 51 in which the light source is in the on-state is more strongly reflected in the synthesis image 53, and hence such the synthesis image 53 that the light source is in between the on-state and the off-state can be avoided.

According to the first embodiment, when the first image deviation amount G1 is calculated, an estimate image deviation amount G3 (see FIG. 7) calculated from the history of the second image deviation amount G2 is preferably utilized. In other words, the first image deviation amount calculation unit 41 calculates the first image deviation amount G1 based on the detection result of the attitude detector 30 and the estimate image deviation amount G3 estimated from the history of the second image deviation amount G2 calculated in the past.

The second image deviation amount G2 is a position deviation amount between frames, and hence the second image deviation amount G2 has continuity that corresponds to a time-series change in the attitude of the corresponding imaging device 11 or a time-series change in a field of view (view) associated with movement of the movable body 1. Thus, as shown in FIG. 7, the estimate image deviation amount G3 of a next frame can be calculated by approximate calculation or the like based on changes in the second image deviation amount G2 from past time points showing G2(n−2), G2(n−1), and G2(n) where n represents the current frame to the present time.

The first image deviation amount calculation unit 41 calculates the first image deviation amount G1 by performing a weighted sum of a deviation amount calculated from the detection result of the attitude detector 30 and the estimate image deviation amount G3. Consequently, even when noise or the like is contained in the detection result of the attitude detector 30, calculation of an outlier, which is impossible to occur in chronological order, as the first image deviation amount G1 is suppressed.

[Control Processing of Dynamic Image Processing Device]

Control processing of the dynamic image processing device 20 is now described with reference to FIG. 8. In the following, processing performed by the first image deviation amount calculation unit 41, processing performed by the second image deviation amount calculation unit 42, and processing performed by the image synthesis unit 43 are not distinguished from each other, but the control processing is described as processing performed by each of the CPUs 21.

Figure 8:
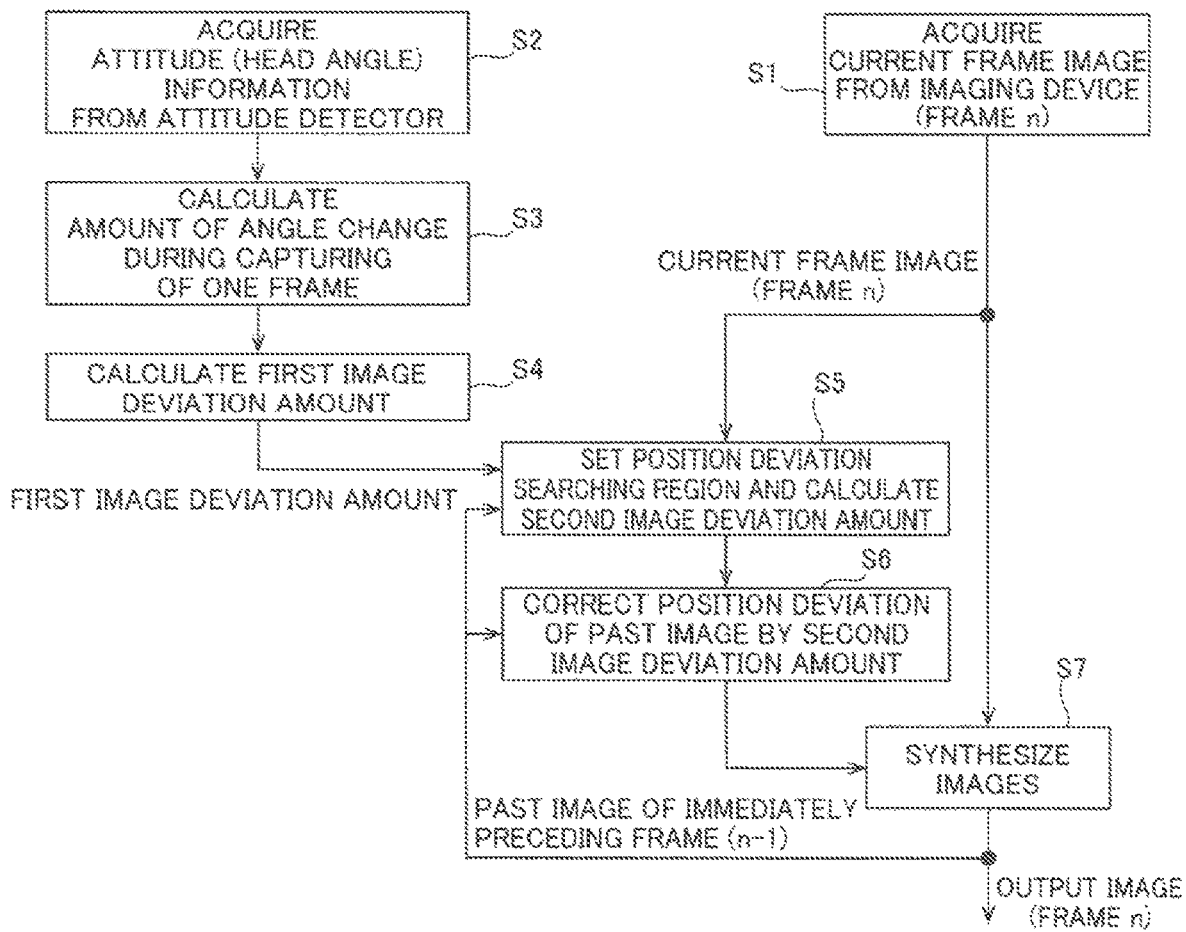
FIG. 8 A flowchart for illustrating control processing of the dynamic image processing device according to the first embodiment of the present invention.

At a step S1 in FIG. 8, each of the CPUs 21 of the dynamic image processing device 20 acquires the current frame image 51 from the corresponding imaging device 11. Assume that the current frame is an n-th frame. The immediately preceding frame is an (n−1)-th frame.

Concurrently with the step S1, each of the CPUs 21 acquires current (current frame (n)) angular information about the corresponding imaging device 11 as the detection result from the attitude detector 30 at a step S2. At a step S3, each of the CPUs 21 calculates the amount of angle change during one frame based on angular information in one frame before (n−1) stored in a corresponding memory 22 and angular information in the current frame (n). At a step S4, each of the CPUs 21 calculates the first image deviation amount G1 with the above formula (1) from the calculated amount of angle change.

Then, at a step S5, each of the CPUs 21 sets the position deviation searching region 61 based on the first image deviation amount G1 and calculates the second image deviation amount G2 by image analysis (pattern matching). Then, at a step S6, each of the CPUs 21 corrects the position deviation of the past image 52 displayed in the immediately preceding frame (n−1) by the calculated second image deviation amount G2.

Then, at a step S7, each of the CPUs 21 synthesizes the corrected past image 52 and the current frame image 51 by the recursive filtering. Each of the CPUs 21 outputs the obtained synthesis image 53 as the output image of the current frame (n) that corresponds to the current frame image 51 to the corresponding display element 14 of the HMD 10 and stores the same in the corresponding memory 22.

The above control processing is repeated for each frame such that image processing of the dynamic image processing device 20 is performed. Consequently, in the HMD system 100, image processing is performed on the dynamic image captured by each of the imaging devices 11 by the dynamic image processing device 20, and thereafter the dynamic image is displayed as the output image on the HMD 10 (display screen 12).

Effects of First Embodiment

According to the first embodiment, the following effects can be obtained.

According to the first embodiment, as hereinabove described, the dynamic image processing device 20 includes the first image deviation amount calculation unit 41 that calculates the first image deviation amount G1 in the yawing and pitching directions of the corresponding imaging device 11 between the frames captured by the corresponding imaging device 11 based on the detection result of the attitude detector 30, and the second image deviation amount calculation unit 42 that calculates the second image deviation amount G2 between the past image 52 and the current frame image 51 based on the first image deviation amount G1, the current frame image 51 captured by the corresponding imaging device 11, and the past image 52 (the past image 52 of the immediately preceding frame) based on one or the plurality of frame images captured by the corresponding imaging device 11 in the past. Thus, when the second image deviation amount G2 between the past image 51 and the current frame image 51 is calculated, the first image deviation amount G1 based on the detection result of the attitude detector 30 can be utilized, and hence a reduction in the accuracy of position deviation detection can be suppressed even when the sufficient accuracy of position deviation detection is not obtained with image analysis due to the noise NC. Unlike the case where positional correction is performed by only the first image deviation amount G1 based on the detection result of the attitude detector 30, the accuracy of position deviation detection can be ensured by calculating the second image deviation amount G2 even when the detection result of the attitude detector 30 contains a few errors, and hence the robustness can be improved. Furthermore, the first image deviation amount G1 in the yawing and pitching directions of the corresponding imaging device 11 is calculated such that the calculation cost can be reduced as compared with the case where position deviation including position deviation in the rolling direction is considered. Consequently, the accuracy of position deviation detection and the robustness can be improved, and an increase in the calculation cost of image processing can be suppressed.

According to the first embodiment, as hereinabove described, the second image deviation amount calculation unit 42 calculates the second image deviation amount G2 from the current frame image 51 in the position deviation searching region 61 set for the portion of the past image 52, and the position and size of the position deviation searching region 61 in the past image 52 are set based on the first image deviation amount G1. Thus, the position deviation searching region 61 can be narrowed down to a predetermined range centered at the position after the movement by the first image deviation amount G1, utilizing the first image deviation amount G1 based on the detection result of the attitude detector 30. Consequently, the calculation cost can be effectively reduced by narrowing down the position deviation searching region 61 while the accuracy of position deviation detection is ensured.

According to the first embodiment, as hereinabove described, the position deviation searching region 61 is set in the region expanded by the range E that corresponds to the error range of the first image deviation amount G1 around the portion (image portion 62) of the past image 52 after the movement by the first image deviation amount G1. Thus, the position deviation searching region 61 can be restricted to a minimum range in which the error range of the first image deviation amount G1 (the error range of the attitude detector 30) has been considered, and hence the calculation cost can be more effectively reduced.

According to the first embodiment, as hereinabove described, the first image deviation amount calculation unit 41 calculates the first image deviation amount G1 based on the detection result of the attitude detector 30 and the estimate image deviation amount G3 estimated from the history of the second image deviation amount G2 calculated in the past. Thus, even when noise is introduced into the detection result of the attitude detector 30, for example, the estimate image deviation amount G3 is considered such that the detection accuracy of the first image deviation amount G1 can be ensured.

According to the first embodiment, as hereinabove described, the image synthesis unit 43 calculates the degree of similarity between the corrected past image 52 and the current frame image 51 for each local region in the image, and synthesizes the corrected past image 52 and the current frame image 51 by weighting according to the calculated degree of similarity. Thus, when the degree of similarity becomes low although position adjustment is performed, for example, the current frame image 51 is heavily weighted such that an output image in which a more current state (current frame image 51) is reflected can be generated.

According to the first embodiment, as hereinabove described, the image synthesis unit 43 makes the weight of the corrected past image 52 larger than that of the current frame image 51 as the degree of similarity between the corrected past image 52 and the current frame image 51 increases. Thus, when there is no change in the state of the outside world between the frames of the past image 51 and the current frame image 51 (the degree of similarity is high), the weight of the current frame image 51 containing noise can be reduced for synthesis, and hence the noise can be more effectively reduced.

According to the first embodiment, as hereinabove described, the image synthesis unit 43 synthesizes the corrected past image 52 and the current frame image 51 by the recursive filtering. Thus, it is only required to perform a weighted sum of two images, and hence the calculation cost can be effectively reduced.

According to the first embodiment, as hereinabove described, the image synthesis unit 43 outputs, to the display screen 12, the synthesis image 53 obtained by synthesis as the output image of the current frame that corresponds to the current frame image 51, and stores the same as the past image 52 in the next frame in the corresponding memory 22. Thus, synthesis can be performed with the synthesis image 53 obtained in the immediately preceding frame (n−1) having a minimum deviation from the current frame image 51 (frame n), and hence the calculation cost can be reduced.

According to the first embodiment, as hereinabove described, the first image deviation amount calculation unit 41 excludes the image deviation caused by the translation of the corresponding imaging device 11, and calculates the first image deviation amount G1 caused by the rotation of the corresponding imaging device 11. In the case of the user (pilot) that boards the movable body 1 such as an airplane, the user frequently rotates his or her head 2, and the influence of the position deviation caused by the translation is relatively small. Thus, the first image deviation amount calculation unit 41 excludes the image deviation caused by the translation, takes into account only the rotational position deviation, and calculates the first image deviation amount G1 such that the calculation cost can be reduced while an influence on the accuracy of position deviation detection is effectively suppressed.

According to the first embodiment, as hereinabove described, the first image deviation amount calculation unit 41 excludes the rotational position deviation of the corresponding imaging device 11 in the rolling direction, and calculates the first image deviation amount G1 in the yawing and pitching directions of the corresponding imaging device 11. In the HMD 10, the rotation in the rolling direction is less frequent than the movement in the yawing and the pitching directions, and the influence of the position deviation is small. Thus, the first image deviation amount calculation unit 41 excludes the deviation in the rolling direction, takes into account only the deviation in the yawing and pitching directions, and calculates the first image deviation amount G1 such that the calculation cost can be reduced while an influence on the accuracy of position deviation detection is effectively suppressed.

Second Embodiment

An HMD system according to a second embodiment of the present invention is now described with reference to FIGS. 1, 3, and 9 to 11. In the second embodiment, an example of calculating a second image deviation amount G2 from both a first image deviation amount G1 and an image analysis deviation amount obtained by image analysis is described unlike the aforementioned first embodiment showing an example of setting the position deviation searching region 61 based on the first image deviation amount G1 and calculating the second image deviation amount G2 by image analysis (pattern matching) of the position deviation searching region 61. The device configurations (hardware configurations) of the HMD system and a dynamic image processing device according to the second embodiment are similar to those according to the aforementioned first embodiment, and control processing performed by each of CPUs 121 of the dynamic image processing device 120 according to the second embodiment is different from that according to the aforementioned first embodiment. Thus, the configurations similar to those according to the aforementioned first embodiment are denoted by the same reference numerals, to omit the description.

Figure 9:
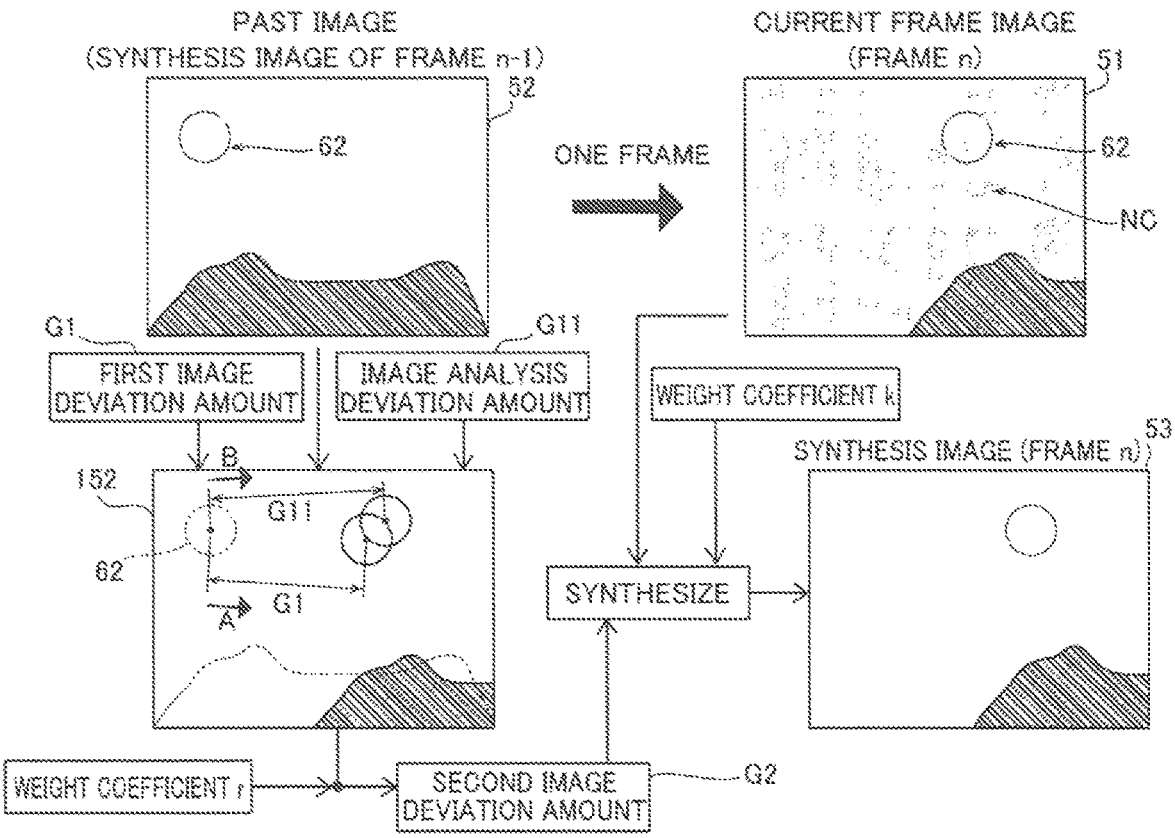
FIG. 9 A conceptual diagram for illustrating image processing of a dynamic image processing device according to a second embodiment of the present invention.

In the HMD system 200 (see FIG. 1) according to the second embodiment, each of the CPUs 121 (second image deviation amount calculation units 42) of the dynamic image processing device 120 (see FIG. 3) analyzes a past image 52 and a current frame image 51 to calculate the image analysis deviation amount G11 between the past image 52 and the current frame image 51, and calculates a second image deviation amount G2 based on the first image deviation amount G1 and the image analysis deviation amount G11, as shown in FIG. 9.

A publicly known method such as pattern matching can be employed to calculate the image analysis deviation amount G11. The second image deviation amount calculation units 42 each perform image analysis such as pattern matching on the entire past image 52 and the entire current frame image 51 to calculate the image analysis deviation amount G11 between the past image 52 and the current frame image 51.

Specifically, assume that the first image deviation amount G1 in a direction A is calculated with respect to the past image 52, as shown in an image 152 in FIG. 9. On the other hand, assume that the image analysis deviation amount G11 in a direction B is calculated with respect to the past image 52 as a result of image analysis. The second image deviation amount calculation units 42 each calculate the second image deviation amount G2 by performing a weighted sum of the obtained first image deviation amount G1 and the obtained image analysis deviation amount G11 with a predetermined weight coefficient r.

More specifically, the second image deviation amount G2 is calculated by the following formula (3).

$$G2 = r \times G1 + (1-r) \times G11 \qquad (3)$$

Consequently, the second image deviation amount G2 is calculated as an intermediate value of a proportion according to the weight coefficient r with respect to the first image deviation amount G1 and the image analysis deviation amount G11.

According to the second embodiment, when the second image deviation amount G2 is calculated, the second image deviation amount calculation units 42 each calculate the second image deviation amount G2 by performing a weighted sum according to the amount of noise NC (amount of noise) of the current frame image 51.

In other words, the amount of noise contained in the current frame image 51 varies depending on an exogenous factor such as the brightness (illuminance) of the outside world. When the outside world is bright such as in the daytime, the amount of noise is small, and the amount of noise becomes larger as the brightness of the outside world is reduced. The error range of the image analysis deviation amount G11 caused by image analysis increase as the amount of noise becomes larger. On the other hands, the error range of the first image deviation amount G1 calculated based on the detection result of an attitude detector 30 can be considered to be substantially constant regardless of the brightness of the outside world or the like. When the amount of noise is small, the accuracy of the image analysis deviation amount G11 can be higher than the accuracy of the first image deviation amount G1.

Figure 10:
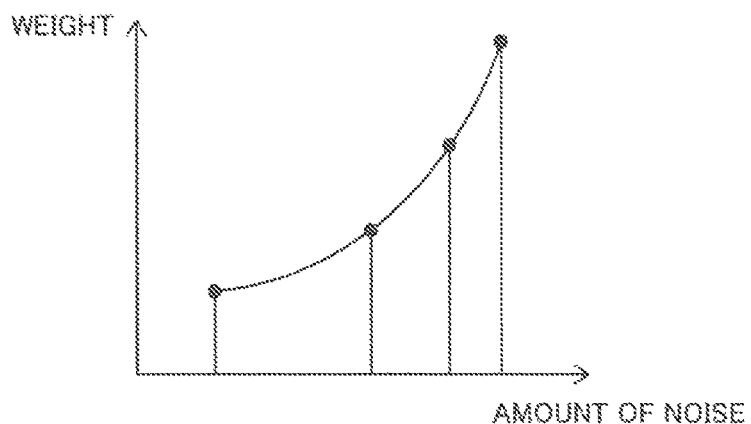
FIG. 10 A diagram showing an example of weight setting of a first image deviation amount and an image analysis deviation amount.

The second image deviation amount calculation units 42 each set the weight coefficient r such that the weight of the first image deviation amount G1 increases (the weight of the image analysis deviation amount G11 decreases) as the amount of noise of the current frame image 51 becomes larger, as shown in FIG. 10. The weight coefficient r can be calculated by storing a plurality of representative values in a corresponding memory 22 and complementing the intermediate value according to the amount of noise based on the representative values, for example, as in FIG. 10. A value of the weight coefficient and the range of the amount of noise that applies the weight coefficient may be associated with each other and may be stored in the memory 22, whereby a graded value according to the amount of noise may be retrieved. The amount of noise of the current frame image 51 may be evaluated by image analysis or by the brightness of the outside world.

Consequently, when the amount of noise of the current frame image 51 is small and the accuracy of the image analysis deviation amount G11 is high (the error range is small), the weight of the image analysis deviation amount G11 increases, and when the amount of noise is large and the accuracy of the image analysis deviation amount G11 is low (the error range is large), the weight of the first image deviation amount G1 increases.

The past image 52 is corrected based on the obtained second image deviation amount G2, and the corrected past image 52 and the current frame image 51 are synthesized.

The remaining configurations of the second embodiment are similar to those of the aforementioned first embodiment.

[Control Processing of Dynamic Image Processing Device]

Control processing of the dynamic image processing device 120 according to the second embodiment is now described with reference to FIGS. 8 and 11.

Steps S1 to S5 in FIG. 11 are similar to those according to the aforementioned first embodiment (see FIG. 8).

At a step S11, each of the CPUs 121 calculates the image analysis deviation amount G11 by performing image analysis on the current frame image 51 of a current frame (n) obtained at the step S1 and the past image 52 of an immediately preceding frame (n−1) stored in the corresponding memory 22.

At a step S12, each of the CPUs 121 determines the weight coefficient r according to the amount of noise contained in the current frame image 51 obtained at the step S1.

At a step S13, each of the CPUs 121 calculates the second image deviation amount G2 by performing a weighted sum of the first image deviation amount G1 obtained at the step S4 and the image analysis deviation amount G11 obtained at the step S11 with the weight coefficient r determined at the step S12. Then, each of the CPUs 121 corrects the past image 52 of the immediately preceding frame (n−1) based on the second image deviation amount G2 at a step S6 and synthesizes the corrected past image 52 and the current frame image 51 at a step S7, similarly to the aforementioned first embodiment.

Effects of Second Embodiment

According to the second embodiment, the following effects can be obtained.

According to the second embodiment, when the second image deviation amount G2 is calculated, the first image deviation amount G1 is utilized such that the accuracy can be maintained with respect to large and small amounts of noise, and the first image deviation amount G1 only in the yawing and pitching directions is calculated such that the calculation cost can be reduced, similarly to the aforementioned first embodiment. Consequently, the accuracy of position deviation detection and the robustness can be improved, and an increase in the calculation cost of image processing can be suppressed.

According to the second embodiment, as hereinabove described, the second image deviation amount calculation units 42 each calculates the second image deviation amount G2 based on the first image deviation amount G1 and the image analysis deviation amount G11. Thus, the second image deviation amount G2 can be calculated in consideration of both the first image deviation amount G1 and the image analysis deviation amount G11. Therefore, even when the amount of noise NC of the current frame image 51 is large and it is difficult to obtain the accuracy of the image analysis deviation amount G11 or even when noise is generated in the detection result of the attitude detector 30 and it is difficult to obtain the accuracy of the first image deviation amount G1, the detection accuracy of the first image deviation amount G1 and the detection accuracy of the image analysis deviation amount G11 are allowed to complement each other, and hence the accuracy of position deviation detection and the robustness can be effectively improved.

According to the second embodiment, as hereinabove described, the second image deviation amount calculation units 42 each calculate the second image deviation amount G2 by performing a weighted sum of the first image deviation amount G1 and the image analysis deviation amount G11 according to the amount of noise of the current frame image 51. Thus, when the amount of noise of the current frame image 51 is large and it is difficult to obtain the accuracy of the image analysis deviation amount G11, the accuracy of position deviation detection can be ensured by heavily weighting the first image deviation amount G1. When the amount of noise of the current frame image 51 is small and the accuracy of the image analysis deviation amount G11 is obtained, improvement in the accuracy of position deviation detection can also be expected by heavily weighting the image analysis deviation amount G11. Consequently, the accuracy of position deviation detection and the robustness can be more effectively improved.

According to the second embodiment, as hereinabove described, the second image deviation amount calculation units 42 each increase the weight of the first image deviation amount G1 as the amount of noise of the current frame image 51 becomes larger. Thus, when the amount of noise of the current frame image 51 is small, the weight of the image analysis deviation amount G11 that enables obtaining high accuracy can be increased, and the first image deviation amount G1 can be more heavily weighted as the amount of noise of the current frame image 51 is larger and it is more difficult to obtain the accuracy of the image analysis deviation amount G11. Consequently, the accuracy of position deviation detection and the robustness can be reliably improved.

The remaining effects of the second embodiment are similar to those of the aforementioned first embodiment.

Modification of Second Embodiment

In the aforementioned second embodiment, an example of determining the weight coefficient according to the amount of noise of the current frame image 51 has been shown, but in a modification of the second embodiment, an example of determining a weight coefficient r based on the amount of change in each of a first image deviation amount G1 and an image analysis deviation amount G11 is described.

The first image deviation amount G1 and the image analysis deviation amount G11 each are a position deviation amount between frames, and hence the first image deviation amount G1 and the image analysis deviation amount G11 each have time-series continuity. Thus, when the first image deviation amount G1 of this time (current frame) significantly varies from the history of the first image deviation amount G1 from a certain point in the past to the present time, for example, as shown in FIG. 12, the same is highly likely to be an outlier as a result of containing noise in the detection result of an attitude detector 30, and it can be evaluated that the reliability of the first image deviation amount G1 is low.

In the modification of the second embodiment, second image deviation amount calculation units 42 each calculate the reliability of each of the first image deviation amount G1 and the image analysis deviation amount G11 by calculating the amount of change V of each of the first image deviation amount G1 and the image analysis deviation amount G11 of this time (current frame) from the history of the first image deviation amount G1 and the image analysis deviation amount G11. The second image deviation amount calculation units 42 each calculate lower reliability as the amount of change V is more likely to be large and the first image deviation amount G1 and/or the image analysis deviation amount G11 are more likely to be outliers. The second image deviation amount calculation units 42 each determine the weight coefficient r according to the proportion of the reliability of the first image deviation amount G1 and the image analysis deviation amount G11.

Consequently, the influence of noise on a calculated second image deviation amount G2 can be reduced by setting the relatively large weight coefficient r to the higher of the reliability of the first image deviation amount G1 and the reliability of the image analysis deviation amount G11 to perform a weighted sum.

Third Embodiment

An HMD system according to a third embodiment of the present invention is now described with reference to FIGS. 1, 3, and 13 to 15. In the third embodiment, an example of correcting a past image by a first image deviation amount G1 and thereafter calculating a second image deviation amount G2 for each local region is described unlike the aforementioned first embodiment and the aforementioned second embodiment. The device configurations (hardware configurations) of the HMD system and a dynamic image processing device according to the third embodiment are similar to those according to the aforementioned first embodiment, and control processing performed by each of CPUs 221 of the dynamic image processing device 220 according to the third embodiment is different from that according to the aforementioned first embodiment. Thus, the configurations similar to those according to the aforementioned first embodiment are denoted by the same reference numerals, to omit the description.

Figure 13:
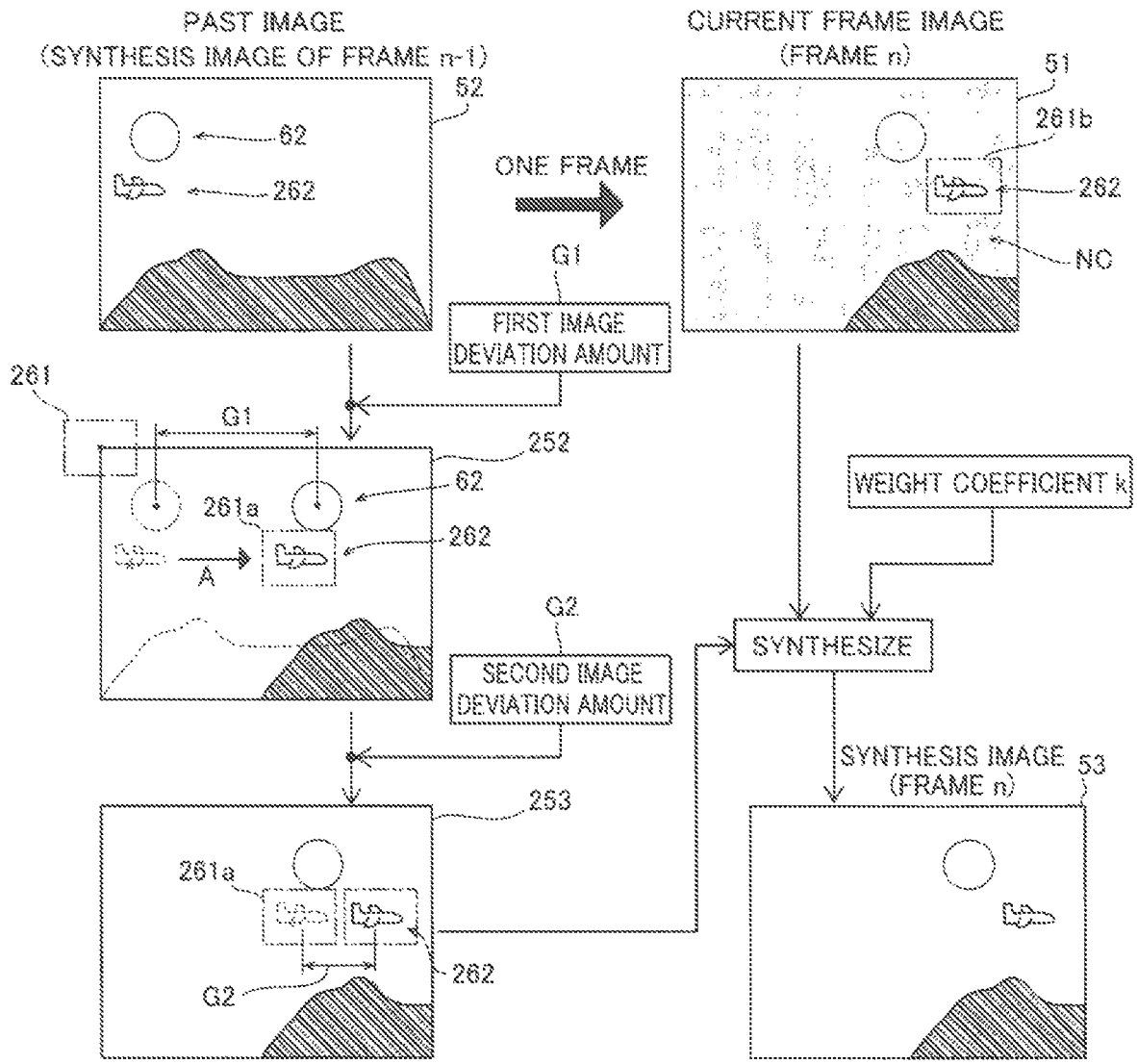
FIG. 13 A conceptual diagram for illustrating image processing of a dynamic image processing device according to a third embodiment of the present invention.

In the HMD system 300 (see FIG. 1) according to the third embodiment, the CPUs 221 (see FIG. 3) of the dynamic image processing device 220 each correct the past image 52 by the first image deviation amount G1 and thereafter calculate the second image deviation amount G2 for each local region 261, as shown in FIG. 13.

In other words, in each of the CPUs 221, a second image deviation amount calculation unit 42 performs position correction on the past image 52 of an immediately preceding frame (n−1) based on the first image deviation amount G1 and calculates the second image deviation amount G2 between a past image 252 on which position correction has been performed and a current frame image 51 for each local region 261 in the image. An image synthesis unit 43 corrects, based on the second image deviation amount G2, the position of each local region 261 of the past image 252 on which position correction has been performed, and synthesizes a corrected past image 253 and the current frame image 51 of a current frame (n).

Specifically, assume that the first image deviation amount G1 in a direction A is calculated with respect to the past image 52 of the immediately preceding frame (n−1). The second image deviation amount calculation unit 42 first performs position correction by the first image deviation amount G1 on the past image 52 and matches an entire image position between the past image 52 and the current frame image 51. Consequently, the corrected past image 252 is obtained.

Here, consider the case where a movable body 262 is reflected in the past image 52 and the current frame image 51. The position of the movable body 262 in the past image 252 (frame (n−1)) on which position correction has been performed and the position of the movable body 262 in the current frame image 51 (frame (n)) are deviated by the amount of movement of the movable body 262 during one frame.

According to the third embodiment, the second image deviation amount calculation unit 42 calculates, as a local second image deviation amount G2, a position deviation of each local region 261 of the past image 252 on which position correction has been performed.

Figure 14:
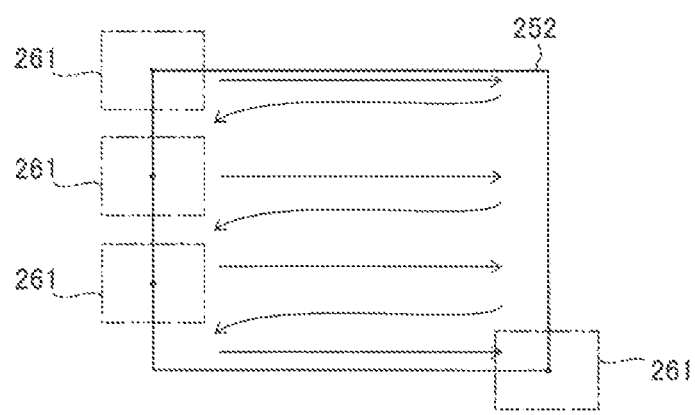
FIG. 14 A diagram for illustrating a local region set in a past image.

The position deviation of each local region 261 is detected by performing pattern matching limited to the local region 261 on the entire past image 52, for example. More specifically, regarding local regions 261 set in the past image 252 on which position correction has been performed, pattern matching is performed on the entire current frame image 51 serving as a comparison target, as shown in FIG. 14. Consequently, local regions 261 at positions of the highest correlation are associated with each other, and the position deviation between the local regions 261 is calculated as the second image deviation amount G2. In an entire region of the past image 252 on which position correction has been performed, setting of the local regions 261 and pattern matching with the current frame image 51 are repeated, whereby the second image deviation amount G2 for each local region 261 is calculated.

Consequently, the second image deviation amount G2 is calculated between a local region 261a of the past image 252 on which position correction has been performed, in which the movable body 262 is reflected, and a local region 261b of the current frame image 51, in which the movable body 262 is reflected, as shown in FIG. 13. The image synthesis unit 43 performs position correction on each local region 261 of the past image 252 on which position correction has been performed based on the second image deviation amount G2, and obtains the past image 253 corrected on each local region 261. The image synthesis unit 43 synthesizes the corrected past image 253 and the current frame image 51. Thus, the possibility of a residual image of the movable body 262 that remains after the entire image position correction between the past image 52 and the current frame image 51 can be reduced by causing the past image 52 to match the current frame image 51.

The local region 261 of the past image 52 in which the movable body 262 is not reflected generally has the highest correlation with the local region 261 of the current frame image 51 at the same position. When an error is contained in the first image deviation amount G1, the highest correlation is obtained in a range deviated by an error range from the same position in the current frame image 51, and hence this position deviation becomes the second image deviation amount G2 for each local region 261.

The remaining configurations of the third embodiment are similar to those of the aforementioned first embodiment.

[Control Processing of Dynamic Image Processing Device]

Control processing of the dynamic image processing device 220 according to the third embodiment is now described with reference to FIGS. 8 and 15.

Figure 15:
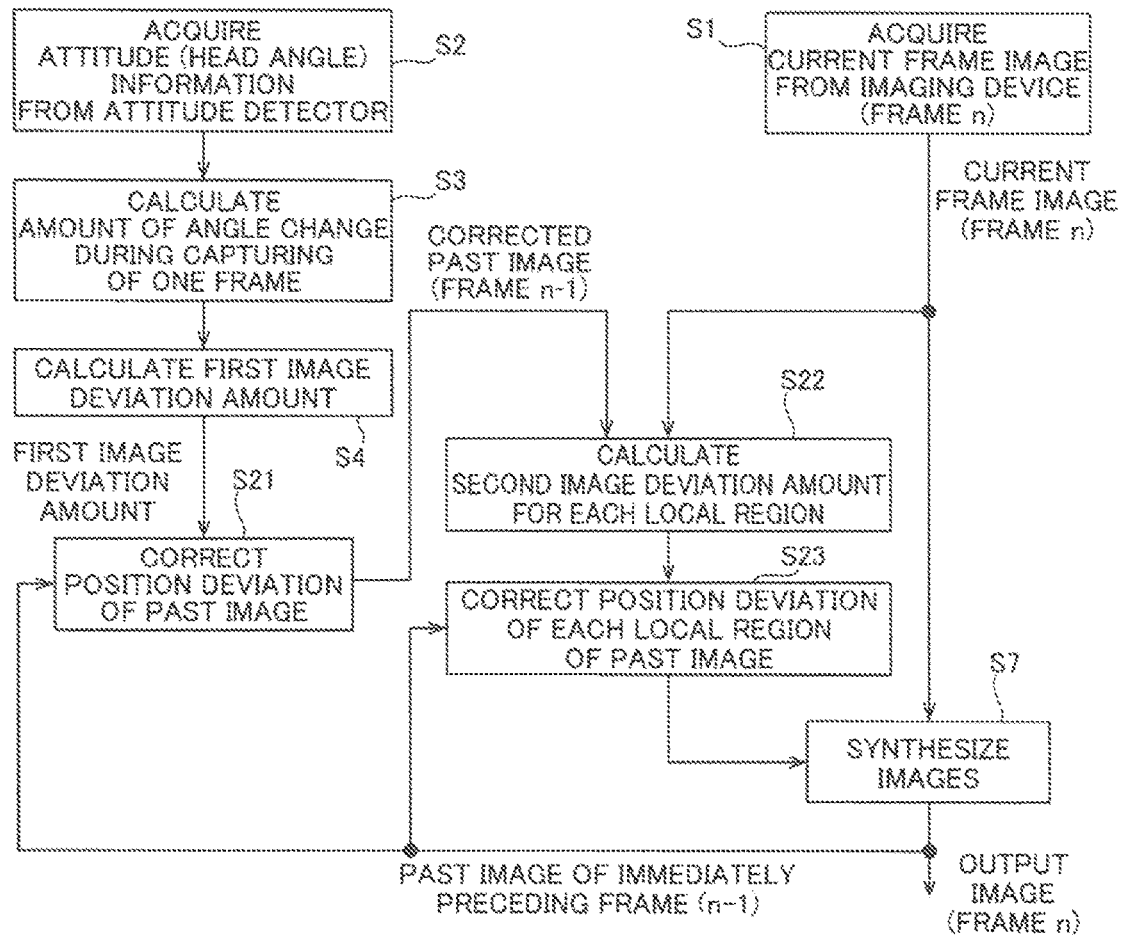
FIG. 15 A flowchart for illustrating control processing of the dynamic image processing device according to the third embodiment of the present invention.

Steps S1 to S5 in FIG. 15 are similar to those according to the aforementioned first embodiment (see FIG. 8).

At a step S21, each of the CPUs 221 corrects the position deviation of the entire past image 52 of the immediately preceding frame (n−1) based on the first image deviation amount G1 obtained at the step S4.

At a step S22, each of the CPUs 221 calculates the second image deviation amount G2 for each local region 261 between the past image 252 on which position correction has been performed at the step S21 and the current frame image 51 obtained at the step S1.

Each of the CPUs 221 corrects the position deviation of each local region 261 based on the obtained second image deviation amount G2 at a step S23, and synthesizes the past image 253 of the immediately preceding frame (n−1) on which position correction has been performed and the current frame image 51 of the current frame (n) at a step S7.

Effects of Third Embodiment

According to the third embodiment, the following effects can be obtained.

According to the third embodiment, when the second image deviation amount G2 is calculated, position deviation is corrected in advance utilizing the first image deviation amount G1 such that the accuracy can be maintained with respect to large and small amounts of noise, and the first image deviation amount G1 only in the yawing and pitching directions is calculated such that the calculation cost can be reduced, similarly to the aforementioned first embodiment. Consequently, the accuracy of position deviation detection and the robustness can be improved, and an increase in the calculation cost of image processing can be suppressed.

According to the third embodiment, as hereinabove described, the second image deviation amount calculation unit 42 performs position correction on the past image 52 based on the first image deviation amount G1, and calculates the second image deviation amount G2 between the past image 252 on which position correction has been performed and the current frame image 51 for each local region 261 in the image. The image synthesis unit 43 corrects, based on the second image deviation amount G2, the position of each local region 261 of the past image 252 on which position correction has been performed, and synthesizes the corrected past image 253 and the current frame image 51. Thus, the position of each local region 261 can be locally corrected based on the second image deviation amount G2, and hence even when the movable body 262 is locally reflected in the entire image, for example, the noise of the entire image can be reduced while local remaining of the residual image in an image portion in which the movable body 262 is reflected is suppressed.

The remaining effects of the third embodiment are similar to those of the aforementioned first embodiment.

The embodiments disclosed this time must be considered as illustrative in all points and not restrictive. The range of the present invention is shown not by the above description of the embodiments but by the scope of claims for patent, and all modifications within the meaning and range equivalent to the scope of claims for patent are further included.

For example, while the example of applying the present invention to the HMD system mounted on the movable body such as an aircraft (an airplane or a helicopter) has been shown in each of the aforementioned first to third embodiments, the present invention is not restricted to this. According to the present invention, the present invention may be applied to an HMD system mounted on a land-based movable body such as a motor vehicle or a sea-based movable body such as a marine vessel, for example. Alternatively, the present invention may be applied to an HMD system used for a game or an HMD system affixed to a user for use in daily life, for example.

While the attitude detector 30 that optically detects the attitudes of the imaging devices 11 from outside the HMD 10 has been shown as an example in each of the first to third aforementioned embodiments, the present invention is not restricted to this. According to the present invention, the attitude detector may be a sensor such as an acceleration sensor or a gyro sensor embedded in the HMD 10, or may use a combination of a sensor method and an optical method, for example. Any method may be used as a method for detecting the attitudes of the imaging devices by the attitude detector.

While the example in which the dynamic image processing device 20 (120, 220) is embedded in the HMD 10 has been shown in each of the aforementioned first to third embodiments, the present invention is not restricted to this. According to the present invention, the dynamic image processing device may be a separate processing unit externally connected to the HMD.

While the example in which the imaging devices 11 and the display elements 14 of the HMD 10, the CPUs 21 of the dynamic image processing device 20, etc. are provided in pairs to display a left eye image and a right eye image has been shown in each of the aforementioned first to third embodiments, the present invention is not restricted to this.

According to the present invention, an HMD that projects an image for only one eye may be used. In this case, the above imaging devices, the above display elements, the above CPUs of the dynamic image processing device, etc. may be provided in the singular. As to the CPUs of the dynamic image processing device, one CPU may generate both a left eye image and a right eye image.

While the example in which the current frame image 51 of the current frame (n) and the past image 52 of the immediately preceding frame (n−1) are synthesized by the recursive filtering has been shown in each of the aforementioned first to third embodiments, the present invention is not restricted to this. According to the present invention, the current frame image and the past image may be synthesized by a method other than the recursive filtering. Synthesis may be performed by moving average filtering for calculating a moving average of past images of a plurality of frames and a current frame image, for example. In the moving average filtering, the calculation cost is increased as compared with the recursive filtering.

DESCRIPTION OF REFERENCE NUMERALS

2 Head
10 HMD (head mounted display)
11 Imaging device
12 Display screen
20, 120, 220 Dynamic image processing device
30 Attitude detector (attitude detection means)
41 First image deviation amount calculation unit (first image deviation amount calculation means)
42 Second image deviation amount calculation unit (second image deviation amount calculation means)
43 Image synthesis unit (image synthesis means)
51 Current frame image
52, 252, 253 Past image
61 Position deviation searching region
100, 200, 300 HMD system (head mounted display system)
G1 First image deviation amount
G2 Second image deviation amount
G11 Image analysis deviation amount

The invention claimed is:

1. A dynamic image processing device for a head mounted display worn on a head of a user and comprising an imaging device that captures an image at a frame interval and a display screen, the dynamic image processing device comprising:
at least one processor configured to:
detect an attitude of the imaging device affixed to the head of the user for each of a plurality of image frames captured by the imaging device;
calculate a first image deviation amount in yawing and pitching directions of the imaging device between the image frames captured by the imaging device based on the detected attitudes of the imaging device;
set a position and a size of a position deviation searching region in a past image based on the first image deviation amount;
calculate a second image deviation amount between the past image and a current frame image by performing pattern matching in the position deviation searching region for a portion of the past image;
correct the past image based on the second image deviation amount; and
synthesize the past image that is corrected and the current frame image.

2. The dynamic image processing device for the head mounted display according to claim 1, wherein the set position deviation searching region is a region that is expanded by a range that corresponds to an error range of the first image deviation amount around the portion of the past image after movement by the first image deviation amount.

3. The dynamic image processing device for the head mounted display according to claim 1, wherein the at least one processor is further configured to:
analyze the past image and the current frame image to calculate an image analysis deviation amount between the past image and the current frame image, and
calculate the second image deviation amount based on the first image deviation amount and the image analysis deviation amount.

4. The dynamic image processing device for the head mounted display according to claim 3, wherein the at least one processor is further configured to: calculate the second image deviation amount by performing a weighted sum of the first image deviation amount and the image analysis deviation amount according to an amount of noise of the current frame image.

5. The dynamic image processing device for the head mounted display according to claim 4, wherein the at least one processor is further configured to, increase a weight of the first image deviation amount as the amount of noise of the current frame image becomes larger.

6. The dynamic image processing device for the head mounted display according to claim 1, wherein the at least one processor is further configured to:
perform position correction on the past image based on the first image deviation amount, and calculate the second image deviation amount between the past image on which the position correction has been performed and the current frame image for each local region in the image,
correct, based on the second image deviation amount, a position of the each local region of the past image on which the position correction has been performed, and
synthesize the past image that is corrected and the current frame image.

7. The dynamic image processing device for the head mounted display according to claim 1, wherein the at least one processor is further configured to: calculate the first image deviation amount based on the detected attitudes of the imaging device, and an estimated image deviation amount estimated from a history of the second image deviation amount calculated in the past.

8. The dynamic image processing device for the head mounted display according to claim 1, wherein the at least one processor is further configured to: calculate a degree of similarity between the past image that is corrected and the current frame image for each local region in the image, and synthesize the past image that is corrected and the current frame image by weighting according to the degree of similarity that is calculated.

9. The dynamic image processing device for the head mounted display according to claim 8, wherein the at least one processor is further configured to: make a weight of the past image that is corrected larger than that of the current frame image as a degree of similarity between the past image that is corrected and the current frame image increases.

10. The dynamic image processing device for the head mounted display according to claim 1, wherein the at least one processor is further configured to: synthesize the past image that is corrected and the current frame image by recursive filtering.

11. The dynamic image processing device for the head mounted display according to claim 1, wherein the at least one processor is further configured to: output, to the display screen, a synthesis image obtained by synthesis as an output image of a current frame that corresponds to the current frame image, and store the synthesis image as the past image in a next frame.

12. The dynamic image processing device for the head mounted display according to claim 1, wherein the at least one processor is further configured to: exclude image deviation caused by translation of the imaging device, and calculate the first image deviation amount caused by rotation of the imaging device.

13. The dynamic image processing device for the head mounted display according to claim 1, wherein the at least one processor is further configured to: exclude rotational position deviation of the imaging device in a rolling direction, and calculate the first image deviation amount in yawing and pitching directions of the imaging device.

14. A dynamic image processing method for a head mounted display worn on a head of a user and comprising an imaging device that captures an image at a frame interval and a display screen, the dynamic image processing method comprising:
   detecting an attitude of the imaging device affixed to the head of the user for each of a plurality of image frames captured by the imaging device;
   calculating a first image deviation amount in yawing and pitching directions of the imaging device between the image frames captured by the imaging device based on the detected attitudes of the imaging device;
   setting a position and a size of a position deviation searching region in a past image based on the first image deviation amount;
   calculating a second image deviation amount between the past image and a current frame image by performing pattern matching in the position deviation searching region;
   correcting the past image based on the second image deviation amount; and
   synthesizing the past image that is corrected and the current frame image.

15. A head mounted display system comprising:
   a head mounted display worn on a head of a user and comprising an imaging device that captures an image at a frame interval and a display screen; and
   a dynamic image processing device that displays the image captured by the imaging device on the display screen, wherein the dynamic image processing device includes a processor configured to:
   detect an attitude of the imaging device affixed to the head of the user for each of a plurality of image frames captured by the imaging device,
   calculate a first image deviation amount in yawing and pitching directions of the imaging device between the image frames captured by the imaging device based on the detected attitudes of the imaging device,
   set a position and a size of a position deviation searching region in a past image based on the first image deviation amount,
   calculate a second image deviation amount between the past image and a current frame image by performing pattern matching in the position deviation searching region,
   correct the past image based on the second image deviation amount; and
   synthesize the past image that is corrected and the current frame image.

16. A dynamic image processing device for a head mounted display worn on a head of a user and comprising an imaging device that captures an image at a frame interval and a display screen, the dynamic image processing device comprising:
   at least one processor configured to:
   detect an attitude of the imaging device affixed to the head of the user;
   calculate a first image deviation amount in yawing and pitching directions of the imaging device between the image frames captured by the imaging device based on the detected attitudes of the imaging device;
   calculate a second image deviation amount between a past image based on one or a plurality of frame images captured by the imaging device in the past and a current frame image captured by the imaging device by performing pattern matching between the past image that is corrected based on the first image deviation amount and the current frame image;
   correct the past image based on the second image deviation amount; and
   synthesize the past image that is corrected and the current frame image.

* * * * *